(12) United States Patent
Matheis et al.

(10) Patent No.: US 10,113,452 B2
(45) Date of Patent: Oct. 30, 2018

(54) EXHAUST VALVE ASSEMBLY FOR A TWO-STROKE INTERNAL COMBUSTION ENGINE AND METHOD FOR CLEANING SAME

(71) Applicant: BRP-ROTAX GMBH & CO. KG, Gunskirchen (AT)

(72) Inventors: Andreas Matheis, Ruhstorf (DE); Markus Doppelbauer, Gunskirchen (AT); Martin Schallauer, Bad Schallerbach (AT); Christian Berger, Meggenhofen (AT); Guenther Roland, Buchkirchen (AT)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 60 days.

(21) Appl. No.: 15/419,175

(22) Filed: Jan. 30, 2017

(65) Prior Publication Data
US 2017/0218798 A1    Aug. 3, 2017

Related U.S. Application Data

(60) Provisional application No. 62/289,271, filed on Jan. 31, 2016.

(51) Int. Cl.
*F02B 27/02*     (2006.01)
*F01L 3/20*      (2006.01)
(Continued)

(52) U.S. Cl.
CPC .............. *F01L 3/20* (2013.01); *F01L 1/02* (2013.01); *F01L 1/38* (2013.01); *F01L 5/20* (2013.01);
(Continued)

(58) Field of Classification Search
CPC ....... F01L 1/02; F01L 1/38; F01L 5/20; F02B 33/04; F02B 25/20; F02B 75/02; F02B 2075/05; F02B 77/04
(Continued)

(56) References Cited

U.S. PATENT DOCUMENTS

| | | |
|---|---|---|
| 4,522,029 A | 6/1985 | Tomita et al. |
| 4,539,813 A | 9/1985 | Tomita et al. |

(Continued)

FOREIGN PATENT DOCUMENTS

| | | |
|---|---|---|
| EP | 1988270 A1 | 11/2008 |
| FR | 2707343 A1 | 1/1995 |

(Continued)

OTHER PUBLICATIONS

European Patent Office; Extended European Search Report of Application No. 17153728.5; Luca Vedoato; dated Jun. 30, 2017.

(Continued)

*Primary Examiner* — Marguerite McMahon
(74) *Attorney, Agent, or Firm* — BCF LLP

(57) ABSTRACT

An exhaust valve assembly for a two-stroke internal combustion engine has a valve actuator, and a two-part valve having a primary and secondary valves defining first and second decompression passages respectively. The primary valve is operatively connected to the valve actuator. The primary valve is in first, second and third primary valve positions when the valve actuator is in first, second and third actuator positions respectively. The secondary valve is in a first secondary valve position when the valve actuator is in the first or the second actuator position and in a second secondary valve position when the valve actuator is in the third actuator position. The first and second valve decompression passages fluidly communicate with each other when the valve actuator is in the second actuator position, and are fluidly separate from each other when the valve actuator is the first or the third actuator position.

20 Claims, 16 Drawing Sheets

(51) Int. Cl.
*F01L 1/02* (2006.01)
*F02B 75/02* (2006.01)
*F02B 77/04* (2006.01)
*F02B 25/20* (2006.01)
*F02B 33/04* (2006.01)
*F01L 1/38* (2006.01)
*F01L 5/20* (2006.01)
*F02D 13/02* (2006.01)

(52) U.S. Cl.
CPC ............ *F02B 25/20* (2013.01); *F02B 33/04* (2013.01); *F02B 75/02* (2013.01); *F02B 77/04* (2013.01); *F02D 13/0284* (2013.01); *F02B 2075/025* (2013.01); *F02D 2013/0288* (2013.01)

(58) Field of Classification Search
USPC ........................................ 123/65 PE, 65 EM
See application file for complete search history.

(56) References Cited

U.S. PATENT DOCUMENTS

| | | | |
|---|---|---|---|
| 4,541,371 A | 9/1985 | Kageyama et al. | |
| 4,554,785 A | 11/1985 | Oike | |
| 4,558,566 A | 12/1985 | Shirakura | |
| 4,570,439 A | 2/1986 | Uchinishi | |
| 4,723,514 A | 2/1988 | Taniuchi | |
| 4,827,880 A | 5/1989 | Ban et al. | |
| 4,909,033 A | 3/1990 | Ueda | |
| 4,999,999 A | 3/1991 | Takahashi et al. | |
| 5,000,131 A | 3/1991 | Masuda | |
| 5,063,888 A | 11/1991 | Ozawa et al. | |
| 5,189,266 A | 2/1993 | Sasaki et al. | |
| 5,220,890 A | 6/1993 | Koriyama | |
| 5,317,112 A | 5/1994 | Lee | |
| 5,502,963 A | 4/1996 | Inaba | |
| 5,575,246 A | 11/1996 | Ito | |
| 5,697,332 A | 12/1997 | Asai et al. | |
| 5,752,476 A | 5/1998 | Nakamura | |
| 5,934,958 A | 8/1999 | Ochiai | |
| 6,158,215 A * | 12/2000 | Bosch | F02B 27/06 123/65 EM |
| 6,216,648 B1 | 4/2001 | Spaulding | |
| 6,244,227 B1 | 6/2001 | Matte | |
| 6,273,036 B1 | 8/2001 | Uchida et al. | |
| 6,481,394 B1 | 11/2002 | Hiki | |
| 6,647,933 B2 | 11/2003 | Tsukada et al. | |
| 6,810,839 B2 | 11/2004 | Gohou | |
| 7,213,544 B2 | 5/2007 | Zauner | |
| 7,367,295 B2 | 5/2008 | Zauner | |
| 7,484,482 B1 * | 2/2009 | Mayringer | F02B 25/20 123/65 PE |
| 7,762,220 B2 | 7/2010 | Okanovic et al. | |
| 8,201,526 B2 | 6/2012 | Sekira | |
| 9,341,092 B2 * | 5/2016 | Zauner | F01L 3/08 |
| 9,404,399 B2 * | 8/2016 | Doppelbauer | F01L 1/38 |
| 2002/0002958 A1 | 1/2002 | Uchida et al. | |
| 2005/0166872 A1 | 8/2005 | Zauner | |
| 2007/0186882 A1 | 8/2007 | Zauner | |
| 2008/0283029 A1 | 11/2008 | Sekira | |

FOREIGN PATENT DOCUMENTS

| | | |
|---|---|---|
| JP | S6235020 A | 2/1987 |
| JP | S63186914 A | 8/1988 |
| JP | H0199922 U | 7/1989 |
| JP | H04113746 U | 10/1992 |
| JP | 05086868 A | 4/1993 |
| JP | H05133230 A | 5/1993 |
| JP | H05156921 A | 6/1993 |
| JP | H05179962 A | 7/1993 |
| JP | 07279675 A | 10/1995 |

OTHER PUBLICATIONS

English translation of abstract of JPH05179962, Received from the European Patent Office along with the Extended European Search Report of Application No. 17153728.5.
Patent abstract of JP05086868, Published Apr. 6, 1993.
Patent abstract of JP07279675, Published Oct. 27, 1995.
European Patent Office; Extended European Search Report of Application No. 14179194.7; Paulson, bo; dated May 29, 2015.
Patent abstract of EP1988270A1, retrieved from https://worldwide.espacenet.com/ dated Jan. 30, 2017.
Patent abstract of JPS6235020, retrieved from https://worldwide.espacenet.com/ dated Jan. 26, 2017.
Patent abstract of JPS63186914, retrieved from https://worldwide.espacenet.com/ dated Jan. 26, 2017.
Patent abstract of JPH05133230, retrieved from https://worldwide.espacenet.com/ dated Jan. 26, 2017.
English translation of abstract of FR2707343, translated by EPO website dated Jan. 26, 2017.
Patent abstract of JPH05156921, retrieved from https://worldwide.espacenet.com/ dated Jan. 30, 2017.

* cited by examiner

EXHAUST VALVE ASSEMBLY FOR A TWO-STROKE INTERNAL COMBUSTION ENGINE AND METHOD FOR CLEANING SAME

CROSS-REFERENCE

The present application claims priority to U.S. Provisional Patent Application No. 62/289,271, filed Jan. 31, 2016, the entirety of which is incorporated herein by reference.

FIELD OF TECHNOLOGY

The present technology relates to exhaust valve assemblies for two-stroke internal combustion engines and to methods for cleaning same.

BACKGROUND

In two-stroke engines, the reciprocal movement of a piston inside a cylinder opens and closes the scavenge and exhaust ports. As the piston continues to move up when the ports are closed, the gases above the piston are compressed. This compression is desirable for the combustion of an air-fuel mixture in the cylinder. However during engine start-up, before a first combustion event can occur in the cylinder, having to compress the gases makes turning the crankshaft connected to the piston harder. As a result, engines having electrical starter motors need to have starter motors that are stronger than if no compression occurred. In engines that are started using manual crank starters, the users need to pull harder on the crank than if no compression occurred.

One solution consists in providing the engine with what is commonly known as a decompression system. Decompression systems provide a passage, called a decompression passage, through which gases above the piston can escape when the scavenge and exhaust ports are closed as the piston moves up, thereby reducing the amount of compression that occurs, thus facilitating engine start-up.

However, in some of these systems, the decompression passage is open during some or all operating conditions of the engine following start-up. As a result, the operational efficiency of the engine is reduced.

One solution to this problem that other decompression systems have used consists in providing a valve for opening the decompression passage during engine start-up and for closing the decompression passage after the engine has started. However, the addition of such a valve adds cost and complexity to the engine.

There is therefore a desire for a decompression system that does not substantially add cost and/or complexity to the engine.

In order to ensure that two-stroke engines have a high power capacity at high speeds, a high volumetric efficiency is required and the charge losses must be minimized This can be accomplished by an early and therefore higher opening of the exhaust passage into the cylinder. In order to obtain maximum power capacity of the engine at high speeds, the adjustment of the exhaust port involves, in the medium speed range, not only an appreciable decrease of the useful stroke, but also a large increase of the charge losses. As a result, the torque decreases and the specific fuel consumption increases greatly. A higher torque in conjunction with lower fuel consumption can be obtained, at lower engine speeds, only if the opening of the exhaust port happens later in the down stroke of the piston. This means that the exhaust port must be at a lower position than it is at high engine speeds.

For this purpose it is known to provide a valve in the exhaust port which is movable between a full flow position and a flow restricting position. When in the flow restricting position, the end of the valve is substantially flush with the peripheral surface of the cylinder bore. In this flow restricting position, the exhaust port is effectively lowered in relation to the down stroke of the piston. The valve is adjustable to vary the relative height of the exhaust port as is required by the given operating conditions of the engine.

During operation, although two-stroke engines are becoming cleaner, some of the fuel and oil does not burn completely. Some of the unburnt fuel and oil, known as coke, sticks to the exhaust valve. The coke on the exhaust valve can cause the valve to stick to the walls of the cylinder block, thereby preventing its proper movement.

To prevent the exhaust valves from sticking due to the coke build up, one solution consists in cycling the exhaust valves rapidly through it various positions. This is typically done at engine start-up or shut-down where the effect on efficiency of the engine is minimal. However, coking can occur during long operation of the engine.

There is therefore a desire for a method for cleaning an exhaust valve during operation of the engine.

SUMMARY

It is an object of the present technology to ameliorate at least some of the inconveniences present in the prior art.

According to one aspect of the present technology, there is provided an exhaust valve assembly for a two-stroke internal combustion engine having a valve actuator movable between a first actuator position, a second actuator position and a third actuator position, the second actuator position being intermediate the first and third actuator positions, and a two-part valve having a primary valve and a secondary valve. The primary valve is operatively connected to the valve actuator. The primary valve defines a first valve decompression passage. The secondary valve defines a second valve decompression passage. The primary valve is in a first primary valve position when the valve actuator is in the first actuator position. The primary valve is in a second primary valve position when the valve actuator is in the second actuator position. The primary valve is in a third primary valve position when the valve actuator is in the third actuator position. The second primary valve position is intermediate the first and the third primary valve positions. The secondary valve is in a first secondary valve position when the valve actuator is in any one of the first and second actuator positions. The secondary valve is in a second secondary valve position when the valve actuator is in the third actuator position. The first valve decompression passage fluidly communicates with the second valve decompression passage when the valve actuator is in the second actuator position. The first valve decompression passage is fluidly separate from the second valve decompression passage when the valve actuator is in any one of the first and third actuator positions.

In some implementations of the present technology, the valve actuator has a fourth actuator position intermediate the second and third actuator positions. The primary valve is in a fourth primary valve position when the valve actuator is in the fourth actuator position. The fourth primary valve position is intermediate the second and third primary valve positions. The secondary valve is in the first secondary valve position when the valve actuator is in the fourth actuator position. The first valve decompression passage is fluidly separate from the second valve decompression passage when the valve actuator is in the fourth actuator position.

In some implementations of the present technology, a third valve decompression passage is defined between the primary and secondary valves. The third valve decompression passage fluidly communicates the first valve decompression passage with the second valve decompression passage when the valve actuator is in the second actuator position.

In some implementations of the present technology, the third valve decompression passage always fluidly communicates with the second valve decompression passage.

In some implementations of the present technology, the first valve decompression passage is offset from the second valve decompression passage.

In some implementations of the present technology, the first valve decompression passage is parallel to the second valve decompression passage. The third valve decompression passage is perpendicular to the first and second valve decompression passages.

In some implementations of the present technology, the primary valve has a first surface, a second surface and an edge. The first surface faces the secondary valve. The second surface is opposite the first surface. The first valve decompression passage defines an aperture in the second surface. The primary valve defines a channel extending from the aperture to the edge.

In some implementations of the present technology, at least one spring biases the secondary valve toward the first secondary valve position.

In some implementations of the present technology, at least one auxiliary valve is connected to the primary valve. The at least one auxiliary valve is movable with the primary valve.

In some implementations of the present technology, the two-part valve is a first two-part valve. The exhaust valve assembly also has a second two-part valve having a primary valve and a secondary valve. The primary valve is operatively connected to the valve actuator. The primary valve defines a first valve decompression passage. The secondary valve defines a second valve decompression passage. The primary valve is in a first primary valve position when the valve actuator is in the first actuator position. The primary valve is in a second primary valve position when the valve actuator is in the second actuator position. The primary valve is in a third primary valve position when the valve actuator is in the third actuator position. The second primary valve position is intermediate the first and the third primary valve positions. The secondary valve is in a first secondary valve position when the valve actuator is in any one of the first and second actuator positions. The secondary valve is in a second secondary valve position when the valve actuator is in the third actuator position. The first valve decompression passage fluidly communicates with the second valve decompression passage when the valve actuator is in the second actuator position. The first valve decompression passage is fluidly separate from the second valve decompression passage when the valve actuator is in any one of the first and third actuator positions.

In some implementations of the present technology, the valve actuator is an electrical valve actuator. The exhaust valve assembly also has a push-pull cable operatively connecting the two-part valve to the valve actuator.

According to another aspect of the present technology, there is provided a two-stroke internal combustion engine having a crankcase, a crankshaft disposed at least in part in the crankcase, a cylinder block connected to the crankcase and a cylinder defined in the cylinder block. The cylinder has a cylinder axis. The cylinder defines a decompression port and an exhaust port. The exhaust port is disposed between the decompression port and the crankshaft with respect to a direction defined by the cylinder axis. The cylinder block defines an exhaust passage extending from the exhaust port and a cylinder decompression passage extending from the decompression port. A piston is movably disposed within the cylinder and is operatively connected to the crankshaft. An exhaust valve selectively extends into the exhaust passage. The valve defines a valve decompression passage. A valve actuator is operatively connected to the exhaust valve. The valve actuator is movable between a first actuator position, a second actuator position and a third actuator position. The second actuator position is intermediate the first and third actuator positions. At least a portion of the exhaust valve is in a first valve position when the valve actuator is in the first actuator position. At least the portion of the exhaust valve is in a second valve position when the valve actuator is in the second actuator position. At least the portion of the exhaust valve is in a third valve position when the valve actuator is in the third actuator position. The second valve position is intermediate the first and the third valve positions. At least the portion of the valve extends further in the exhaust passage in the first valve position than in the second valve position. At least the portion of the valve is withdrawn from the exhaust passage in the third valve position. The valve decompression passage fluidly communicates the cylinder decompression passage with the exhaust passage when the valve actuator is in the second actuator position. The cylinder decompression passage does not fluidly communicate with the exhaust passage via the valve decompression passage when the valve actuator is in any one of the first and third actuator positions.

In some implementations of the present technology, a controller is electronically connected to the valve actuator for controlling a position of the valve actuator. The controller causes the valve actuator to move to the second actuator position in response to a signal indicative of at least one of engine start-up and engine shut-down.

In some implementations of the present technology, when the valve actuator is in the second actuator position, the controller causes the valve actuator to move from the second actuator position to the first actuator prior to moving to the third actuator position.

In some implementations of the present technology, when the valve actuator is in the third actuator position, the controller causes the valve actuator to move from the third actuator position to the first actuator position prior to moving to the second actuator position in response to the signal indicative of the at least one of engine start-up and engine shut-down.

In some implementations of the present technology, the exhaust valve is a two-part valve having a primary valve and a secondary valve. The primary valve is operatively connected to the valve actuator. The primary valve is the portion of the valve. The valve decompression passage includes at least a first valve decompression passage and a second valve decompression passage. The primary valve defines the first valve decompression passage. The secondary valve defines the second valve decompression passage. The first valve position is a first primary valve position of the primary valve. The second valve position is a second primary valve position of the primary valve. The third valve position is a third primary valve position of the primary valve. The secondary valve is in a first secondary valve position when the valve actuator is in any one of the first and second actuator positions. The secondary valve extends in the exhaust passage when in the first secondary valve position. The second valve decompression passage fluidly communicates with the cylinder decompression passage when the secondary valve is in the first secondary valve position. The secondary valve is in a second secondary valve position when the valve actuator is in the third actuator position. The secondary valve is withdrawn from the exhaust passage when in the second secondary valve position. The second valve decompression passage is fluidly separate from the cylinder decompression passage when the secondary valve is in the second secondary valve position. When the valve actuator is in the second actuator position: the first valve decompression passage fluidly communicates with the second valve decompression passage, and the cylinder decompression passage fluidly communicates with the exhaust passage via the first and second valve decompression passages. When the valve actuator is in any one of the first and third actuator positions, the cylinder decompression passage does not fluidly communicate with the exhaust passage via the first and second valve decompression passages.

In some implementations of the present technology, when the valve actuator is in any one of the first and third actuator positions, the first valve decompression passage is fluidly separate from the second valve decompression passage.

In some implementations of the present technology, at least one spring biases the secondary valve toward the first secondary valve position.

In some implementations of the present technology, the exhaust passage is a main exhaust passage. The cylinder defines at least one auxiliary exhaust port. The cylinder block defines at least one auxiliary exhaust passage extending from the at least one auxiliary exhaust port to the main exhaust passage. The exhaust valve has at least one auxiliary exhaust valve connected to the primary exhaust valve and selectively extending in the at least one auxiliary exhaust passage. The at least one auxiliary valve is movable with the primary valve.

In some implementations of the present technology, the valve actuator is an electrical valve actuator. The engine also has a push-pull cable operatively connecting the exhaust valve to the valve actuator.

According to another aspect of the present technology, there is provided a method for cleaning an exhaust valve of a two-stroke internal combustion engine. The method comprises: requesting an exhaust valve cleaning cycle if at least one of a first condition and a second condition is satisfied; initiating the exhaust valve cleaning cycle if at least one of a third condition and a fourth condition is satisfied; and aborting the exhaust valve cleaning cycle if at least one of the at least one of the third and fourth conditions is no longer satisfied. The first condition is a time elapsed since a previous cleaning cycle has been completed being greater than a predetermined time. The second condition is a rate of opening of the exhaust valve being less than predetermined rate. The third condition is a throttle valve being closed. The fourth condition is an engine speed being less than a predetermined engine speed.

In some implementations of the present technology, requesting the exhaust valve cleaning cycle if at least one of the first and the second conditions is satisfied includes: requesting the exhaust valve cleaning cycle if both of the first and the second conditions are satisfied.

In some implementations of the present technology, initiating the exhaust valve cleaning cycle if at least one of the third and the fourth conditions is satisfied includes: initiating the exhaust valve cleaning cycle if both the third and the fourth conditions are satisfied.

In some implementations of the present technology, aborting the exhaust valve cleaning cycle if at least one of the at least one of the third and fourth conditions is no longer satisfied includes: aborting the exhaust valve cleaning cycle if at least one of the third and fourth conditions is no longer satisfied.

In some implementations of the present technology, a rate of opening of the exhaust valve is a number of times the exhaust valve has been moved from any position other than the fully opened position to a fully opened position per minute.

In some implementations of the present technology, a rate of opening of the exhaust valve is a number of times the exhaust valve has moved from a fully lowered position to a fully opened position per minute.

In some implementations of the present technology, the cleaning cycle comprises: a) attempting to move the exhaust valve to a fully lowered position; and b) following step a), attempting to move the exhaust valve to a fully opened position.

In some implementations of the present technology, steps a) and b) are repeated a predetermined number of times.

In some implementations of the present technology, steps a) and b) are repeated at least 5 times.

In some implementations of the present technology, step b) is initiated when: the exhaust valve reaches the fully lowered position; or a predetermined amount of time has elapsed since step a) has been initiated.

In some implementations of the present technology, steps a) and b) are repeated a predetermined number of times. Following step b), step a) is initiated again when: step a) has been repeated for less than the predetermined number of times; and: the exhaust valve reaches the fully opened position; or a predetermined amount of time has elapsed since step b) has been initiated.

In some implementations of the present technology, the cleaning cycle further comprises: increasing an oil pump oil supply rate of an oil pump supplying oil to the exhaust valve prior to initiating step a) for a first time; and resetting the oil pump oil supply rate after completing step b) for a last time.

In some implementations of the present technology, the cleaning cycle further comprises delaying an initiation of step a) for the first time following the increase of the oil pump oil supply rate.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described below with respect to a direct fuel injection, two-stroke, inline, two-cylinder internal combustion engine. It is contemplated that at least some aspects of the present technology could be provided on a two-stroke internal combustion engine that is carbureted or has semi-direct injection, that has cylinders arranged in a V-type or other arrangement, and/or that has only one or more than two cylinders. The present technology will also be described below with respect to an exhaust valve assembly having two two-part valves. It is contemplated that at least some aspects of the present technology could be provided to an exhaust valve assembly having single part valves and/or having only one or more than two valves.

Figure 1:
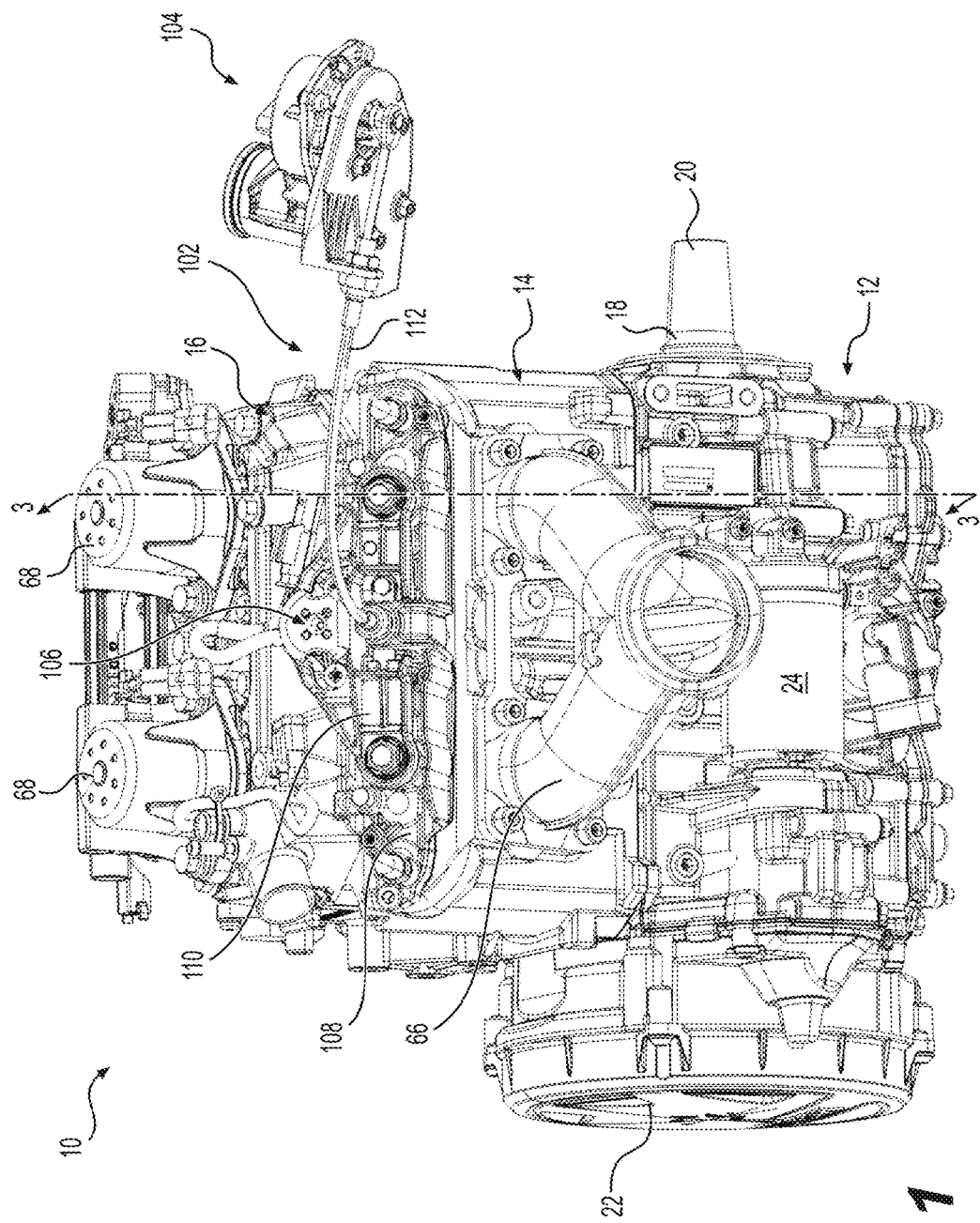
FIG. 1 is a perspective view taken from an exhaust side of a two-stroke internal combustion engine.
Figure 2:
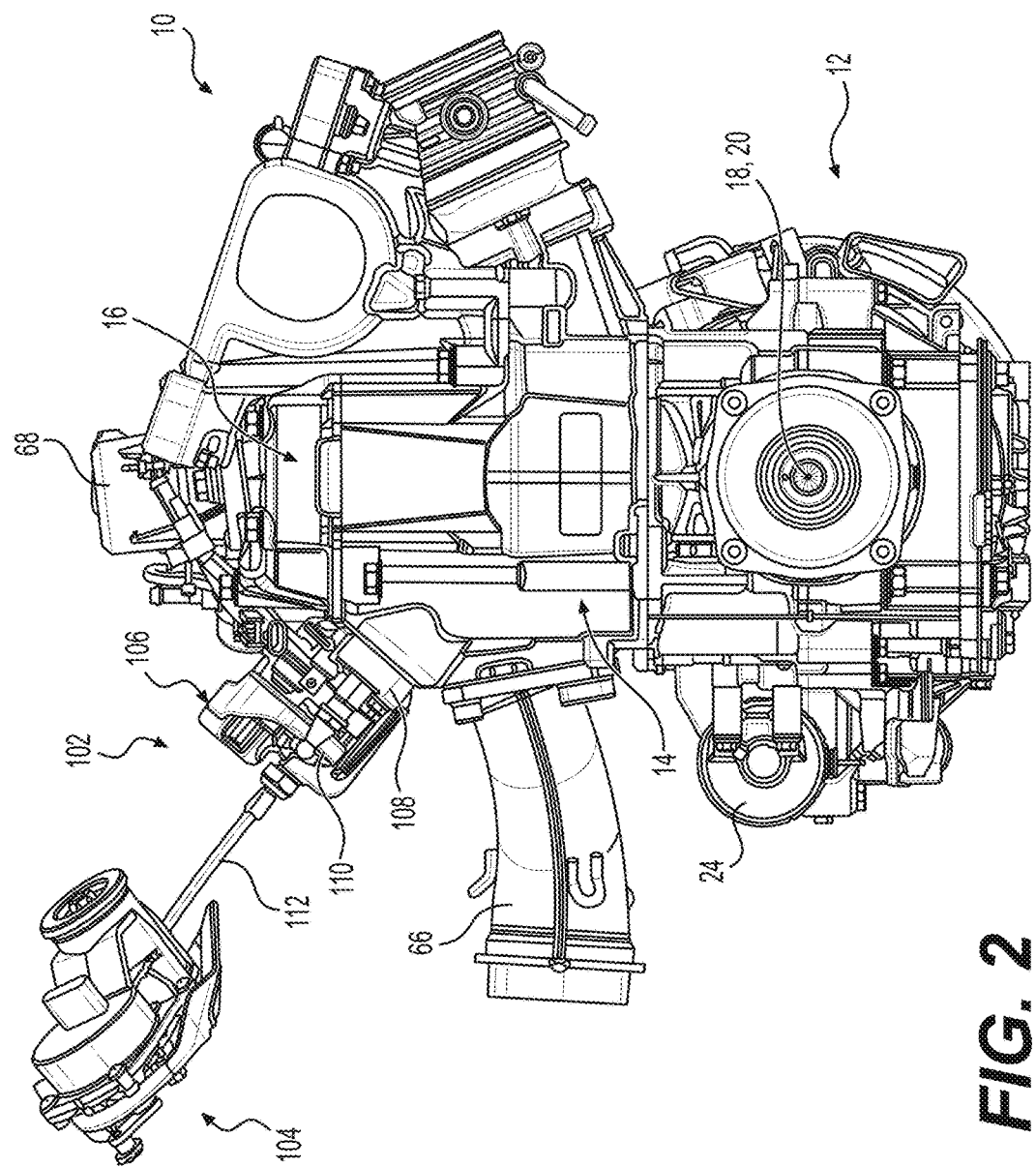
FIG. 2 is a side elevation view of the engine of FIG. 1 taken from a power take-off side of the engine.
Figure 3:
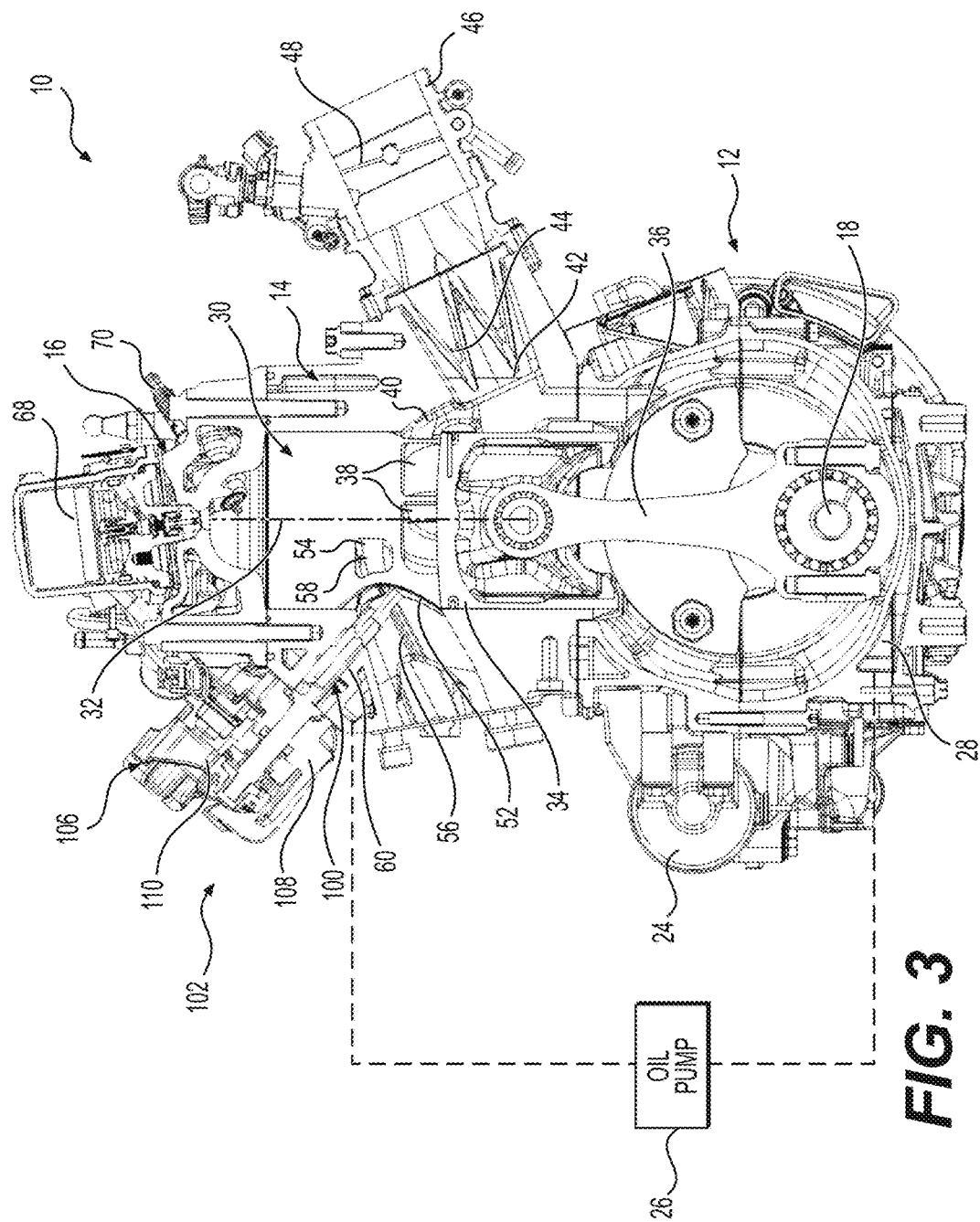
FIG. 3 is a cross-sectional view of the engine of FIG. 1 taken through line 3-3 of FIG. 1.

FIGS. 1 to 3 illustrate an internal combustion engine 10. The engine 10 operates on the two-stroke engine cycle and is therefore referred to as a two-stroke engine 10. The engine 10 has a crankcase 12, a cylinder block 14 connected on top of the crankcase 12 and a cylinder head 16 is connected on top of the cylinder block 14.

The crankcase 12 rotationally supports a crankshaft 18. The crankshaft 18 has a portion disposed inside the crankcase 12 and an end 20 extending outside the crankcase 12. The end 20 of the crankshaft 18 connects to a transmission of a vehicle or another mechanical component to be driven by the engine 10. As such, the side of the engine 10 from which the end 20 of the crankshaft 18 protrudes is referred to herein as the power take-off side of the engine 10. It is contemplated that the crankshaft 18 could not have the end 20 protruding from the crankcase 12 and that instead the engine 10 could have another shaft, called output shaft, rotationally supported by the crankcase 12 and driven by the crankshaft 18. In such an implementation, it is the output shaft that protrudes from the crankcase 12 and is connected to the mechanical component to be driven by the engine 10. It is contemplated the output shaft could be coaxial with or offset from the crankshaft 18.

A magneto (not shown) is connected to the end of the crankshaft 18 opposite the end 20. The magneto generates electricity as the crankshaft 18 makes it rotate. The magneto is disposed in a chamber defined between the crankcase 12 and a cover 22 fastened to the end of the crankcase 12.

An electric starter motor 24 is connected to the side of the crankcase 12. The starter motor 24 selectively engages the crankshaft 18 via gears (not shown) to cause the crankshaft 18 to turn before the engine 10 can run on its own as a result of the internal combustion process in order to start the engine 10.

An oil pump 26 (schematically shown in the FIG. 3) is fluidly connected to various parts of the engine 10 to circulate oil through the engine 10. The oil pump 26 pumps oil from an oil reservoir 28 (FIG. 3) formed in the bottom of the crankcase 12. The oil pumped by the oil pump 26 is distributed to the various components of the engine 10 that need lubrication. The oil then falls back by gravity inside the reservoir 28. Some of the oil also mixes with air inside the crankcase 12 and is combusted by the engine 10.

The cylinder block 14 defines two cylinders 30, one of which is shown in FIG. 3. Each cylinder 30 defines a cylinder axis 32 (FIG. 3). Each cylinder 30 has a piston 34 disposed therein. Each piston 34 is connected to the crankshaft 18 by a connecting rod 36. During operation of the engine 10, each piston 34 reciprocates inside its corresponding cylinder 30 along its corresponding cylinder axis 32.

Each cylinder 30 defines four scavenge ports 38, only two of which are shown in FIG. 3. It is contemplated that each cylinder 30 could define more or less than four scavenge ports 38. For each cylinder 30, the cylinder block 14 defines a plurality of scavenge passages 40 (one of which is shown in FIG. 3) that extend from the scavenge ports 38 and fluidly communicate the scavenge ports 38 with the inside of the crankcase 12. For each cylinder 30, the cylinder block 14 defines an intake passage 42 that fluidly communicates with the scavenge passages 40 and the inside of the crankcase 12 to supply air to the engine 10. A pair of reed valves 44 is disposed inside each air intake passage 42 to prevent fluid from escaping the interior of the engine 10 via the air intake passages 42. Two throttle bodies 46 are connected to the cylinder block 14 in alignment with the air intake passages 42. Each throttle body 46 has a throttle valve 48 that can be pivoted to regulate a flow of air to the engine 10. The throttle valves 48 are mechanically actuated, by a push-pull cable linked to a throttle lever for example. It is contemplated that the throttle valves 48 could be actuated together by a throttle valve actuator such one or two electric motors. It is contemplated that the engine 10 could have a single throttle body 46 and be provided with an air intake manifold fluidly communicating the single throttle body 46 with the various air intake passages 42.

Figure 10:
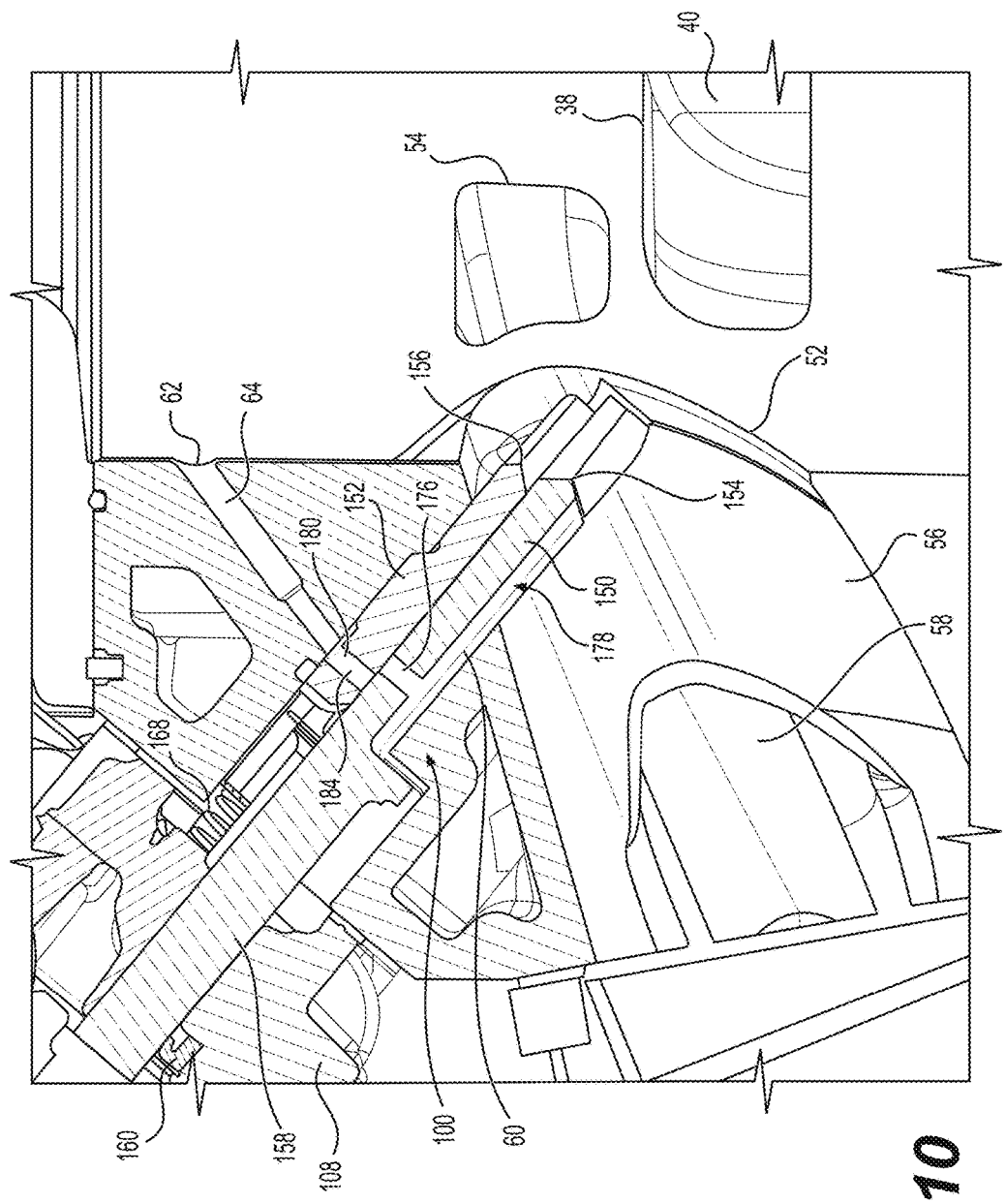
FIG. 10 is a cross-sectional view of a portion of the engine of FIG. 1 taken through a line corresponding to line 10-10 of FIG. 9 of the two-part valve located on the right with respect to the orientation of FIG. 1 when the valve actuator is in a low actuator position.

Each cylinder 30 defines a main exhaust port 52. Each cylinder 30 also defines two auxiliary exhaust ports 54, only one of which is shown in FIG. 3. The auxiliary exhaust ports 54 are disposed on either side of the main exhaust port 52. The scavenge ports 38 are disposed axially between the auxiliary exhaust ports 54 and the crankshaft 18 in a direction defined by the cylinder axis 32. It is contemplated that each cylinder 30 could define more than one main exhaust port 52. It is also contemplated that each cylinder could have only one or more than two auxiliary exhaust ports 54. It is also contemplated that the auxiliary exhaust ports 54 could be omitted. For each cylinder 30, the cylinder block 14 defines a main exhaust passage 56 extending from the main exhaust port 52. For each cylinder 30, the cylinder block 14 defines two auxiliary exhaust passages 58 (one of which is shown in FIG. 3) that extend from the auxiliary exhaust ports 54 and fluidly communicate the auxiliary exhaust ports 54 with the main exhaust passage 56. For each cylinder 30, the cylinder block 14 defines a valve receiving passage 60 that communicates with the main and auxiliary exhaust passages 52, 54. An exhaust valve 100 is received in each valve receiving passage 60. The two exhaust valves 100 are part of an exhaust valve assembly 102 that has a portion connected to the cylinder block 14. The exhaust valves 100 and the exhaust valve assembly 102 will be described in greater detail below. Each cylinder 30 also defines a decompression port 62, best seen in FIG. 10. The main exhaust port 52 is axially between the decompression port 62 and the crankshaft 18 in the direction defined by the cylinder axis 32. As best seen in FIG. 10, for each cylinder 30, the cylinder block 14 defines a cylinder decompression passage 64 that extends from the decompression port 62 to the valve receiving passage 60. An exhaust manifold 66 (FIGS. 1 and 2) is connected to the cylinder block 14 below the exhaust valve assembly 102. The exhaust manifold 66 has two inlets in alignment with the two main exhaust passages 56 and a single outlet.

The cylinder head 16 closes the tops of the cylinders 30 such that for each cylinder 30 a variable volume combustion chamber is defined between the cylinder 30, its corresponding piston 34 and the cylinder head 16. Two fuel injectors 68 and two spark plugs 70 (one of each per cylinder 30) are connected to the cylinder head 16. The fuel injectors 68 are E-TEC™ fuel injectors that inject fuel directly in the combustion chambers. The spark plugs 70 ignite the fuel-air mixture in the combustion chambers.

Figure 14:
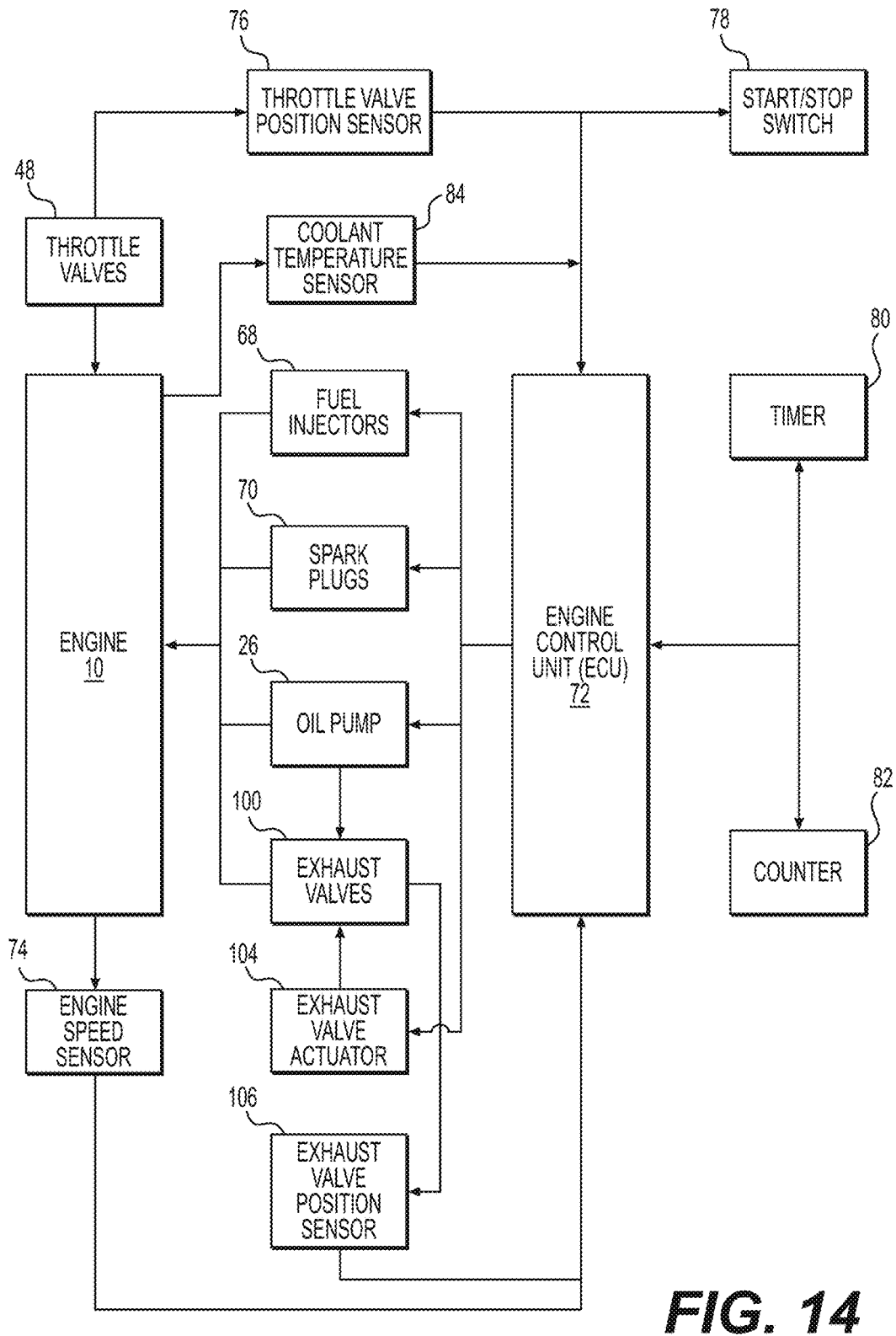
FIG. 14 is a schematic illustration of components of the engine of FIG. 1 and of associated components thereof.

The operation of the fuel injectors 68, the spark plugs 70, the starter motor 24 and the oil pump 26 is controlled by an electronic control unit (ECU) 72 that is schematically illustrated in FIG. 14. The ECU 72 controls these components based on signals received from various sensors and components, some of which are illustrated schematically in FIG. 14. An engine speed sensor 74 senses a speed of rotation of the crankshaft 18 and sends a signal representative of engine speed to the ECU 72. A throttle valve position sensor 76 senses the position of one of the throttle valves 48 and sends a signal representative of the throttle valve position to the ECU 72. A start/stop switch 78 sends a signal to the ECU 72 to start the engine 10 when the engine 10 is stopped and to stop the engine 10 when the engine 10 is running. It is contemplated that the start/stop switch 78 could be separated into a start switch and a separate stop switch. It is contemplated that the start/stop switch 78 could be incorporated into an ignition key assembly or could be a separate button. A coolant temperature sensor 84 senses a temperature of a coolant flowing in a cooling jacket (not shown) of the engine 10 and sends a signal representative of the coolant temperature to the ECU 72.

The ECU 72 also acts as a controller to control a position of the exhaust valves 100. As will be described in greater detail below, the ECU 72 sends signals to an exhaust valve actuator 104 of the exhaust valve assembly 102 to cause it to move the exhaust valves 100 between their various positions. The ECU 72 also receives signals from an exhaust valve position sensor 106 of the exhaust valve assembly 102. The exhaust valve position sensor 106 senses the position of the exhaust valves 100 and sends a signal representative of the exhaust valves position to the ECU 72. The exhaust valve actuator 104 and the exhaust valve position sensor 106 will be described in greater detail below with respect to the exhaust valve assembly 102.

Although a single ECU 72 is illustrated, it is contemplated that the various functions of the ECU 72 could be split between two or more control units/controllers and that at least some of these control units could communicate with each other. For example, it is contemplated that a dedicated controller could be provided to control the exhaust valve actuator 104.

Turning now to FIGS. 4 to 7, the exhaust valve assembly 102 will be described. The exhaust valve assembly 102 has a pair of exhaust valves 100, an exhaust valve actuator 104 and an exhaust valve position sensor 106 as previously described. The exhaust valve assembly 102 also has a base 108, a valve connection member 110 and a push-pull cable 112. The valves 100 are received in the valve receiving passages 60 as described above. The base 108 is fastened to the cylinder block 14. A portion of each of the valves 100 extends through the base 108 and connects to the valve connection member 110. The valve connection member 110 is connected to the push-pull cable 112. The push-pull cable 112 is connected to the exhaust valve actuator 104. The exhaust valve actuator 104 pushes or pulls on the push-pull cable 112 as a result of which the valve connection member 110 moves toward or away from the base 108 respectively. The movement of the valve connection member 110 moves the exhaust valves 100 as will be described in greater detail below. In the present implementation, a single exhaust valve actuator 104 moves both exhaust valves 100 together. It is contemplated that each exhaust valve 100 could have its own exhaust valve actuator 104.

Figure 6:
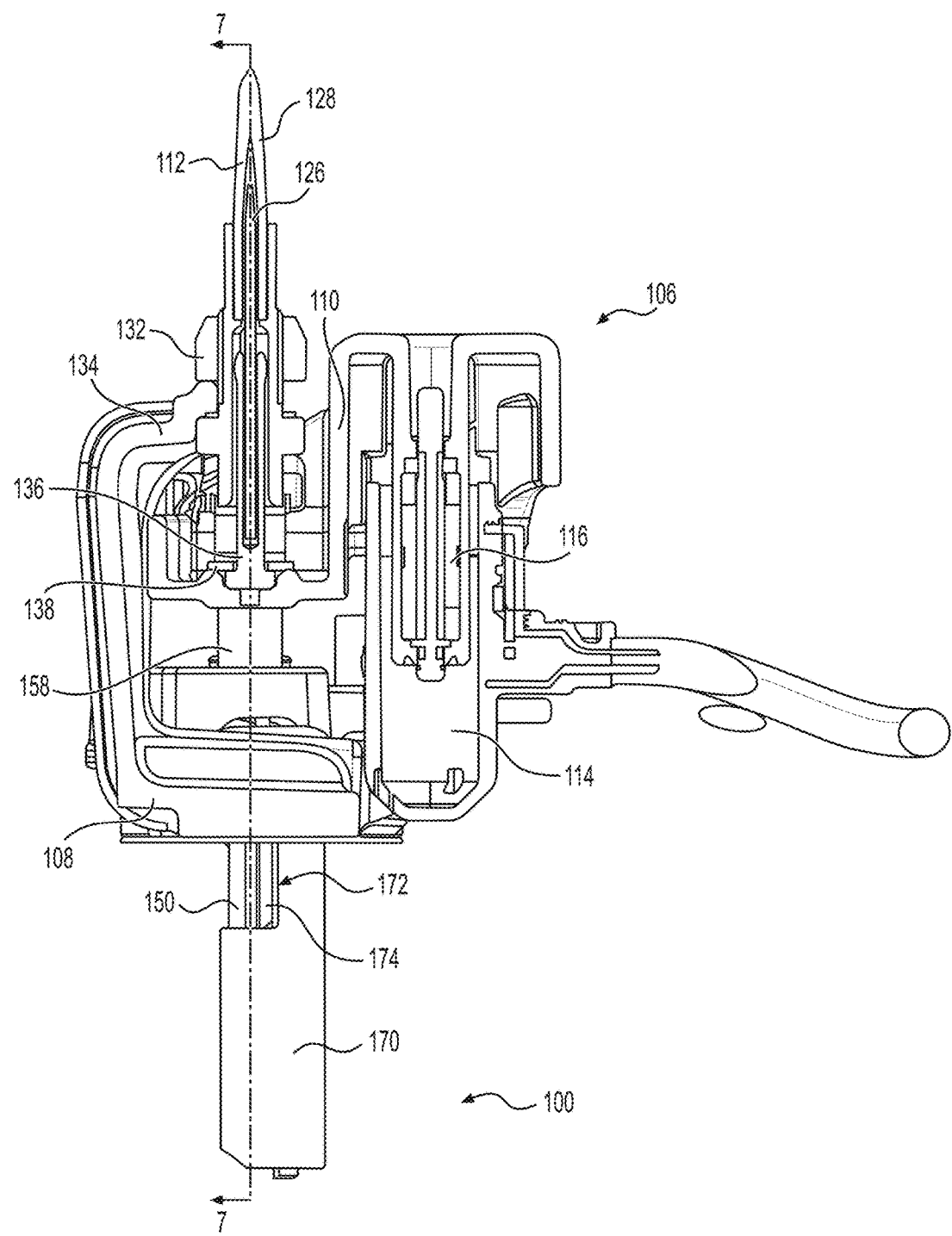
FIG. 6 is a cross-sectional view of the valve actuator and the exhaust valve assembly of FIG. 5 taken through line 6-6 of FIG. 5.

As can be seen in FIG. 6, the exhaust valve position sensor 106 consists of a Hall effect sensor 114 connected to the base 108 and a permanent magnet 116 connected to the valve connection member 110. The permanent magnet 116 slides in and out of the Hall effect sensor 114 as the valve connection member 110 moves toward and away from the base 108 thereby changing the signal generated by the Hall effect sensor 114 and transmitted to the ECU 72. As the exhaust valves 100 are connected to and moved by the valve connection member 110, the signal generated by the Hall effect sensor 114 is indicative of the position of the exhaust valves 100. It is contemplated that other types of position sensors could be used as the exhaust valve position sensor 106.

Figure 4:
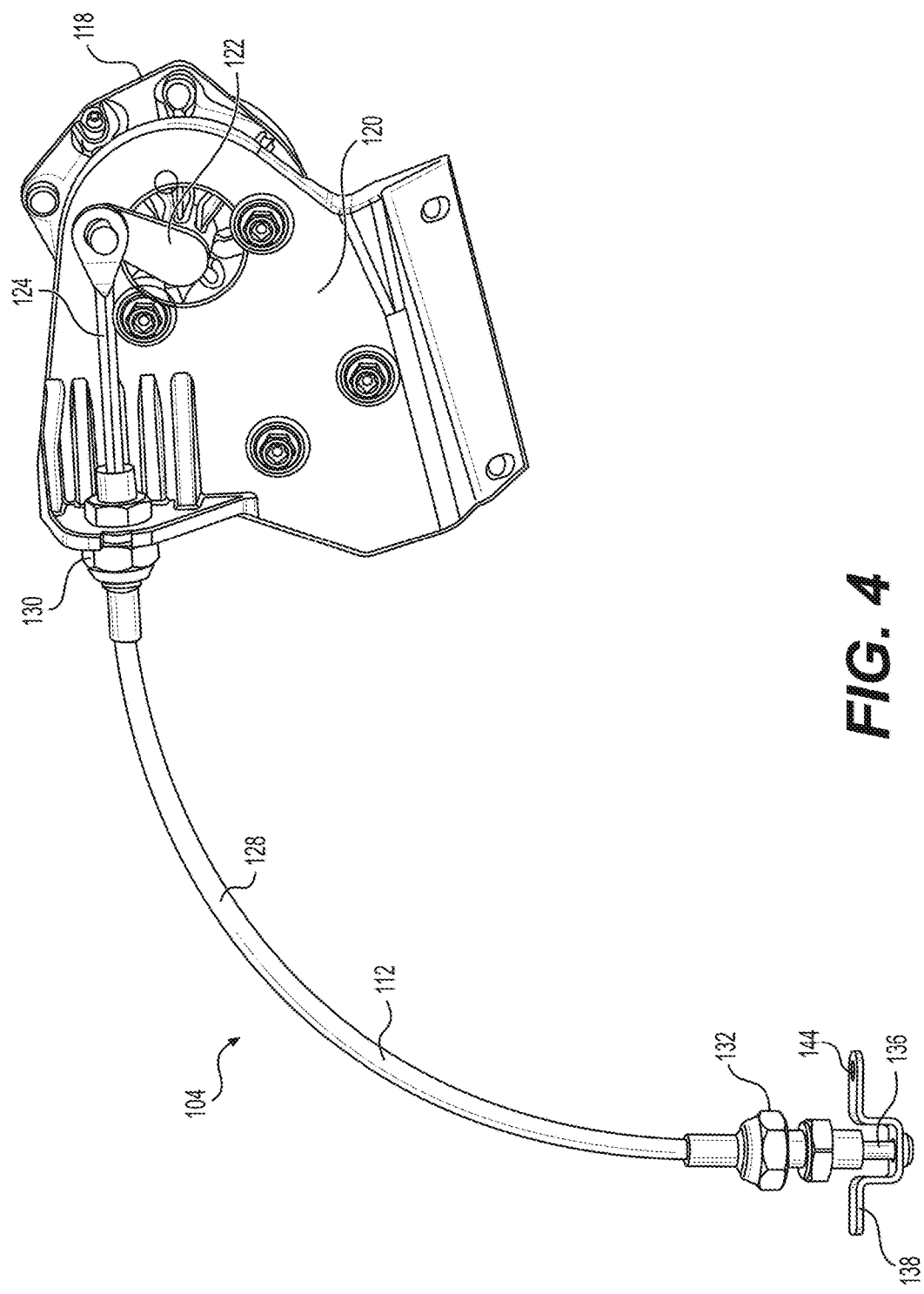
FIG. 4 is a perspective view of a valve actuator of the engine of FIG. 1.
Figure 5:
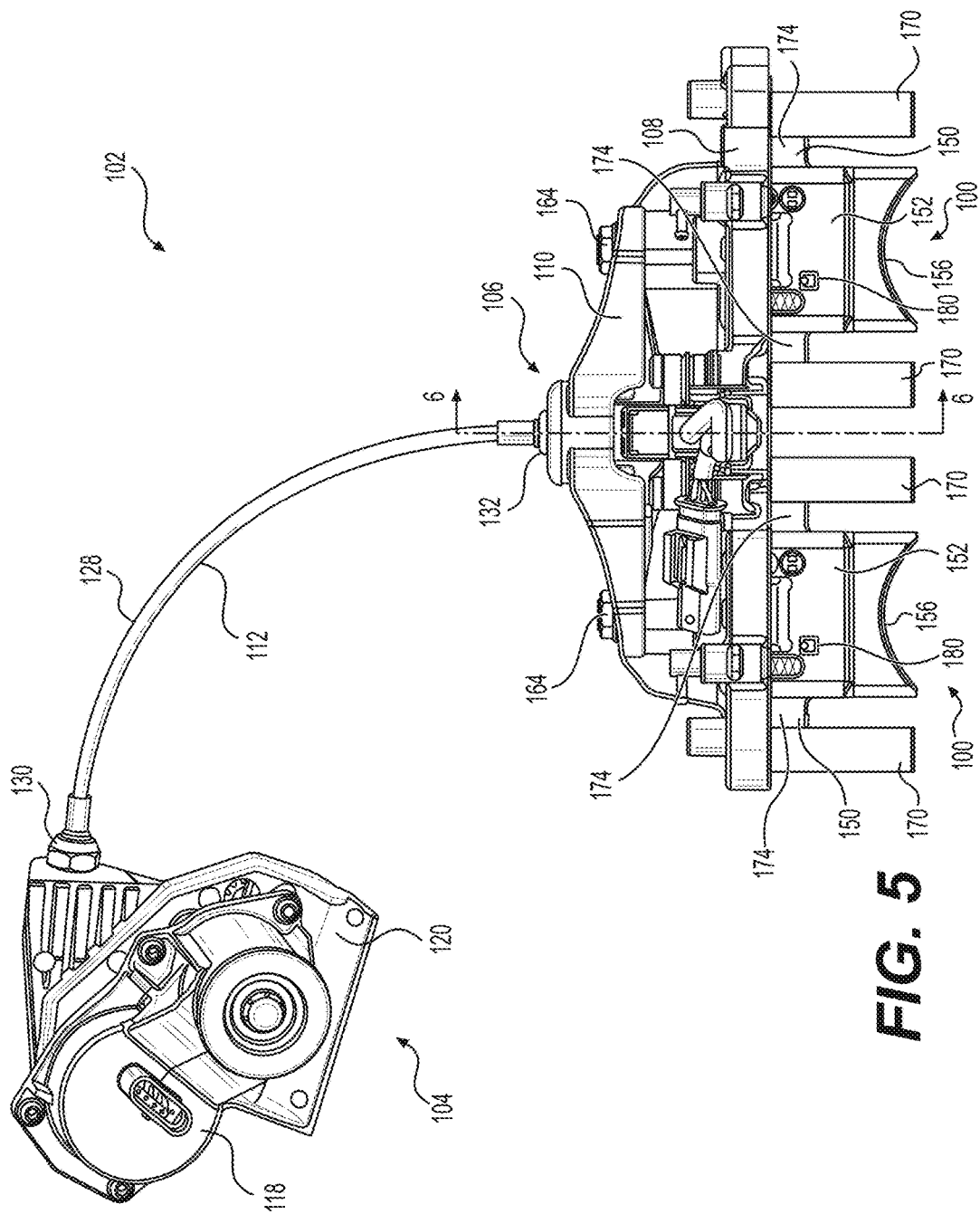
FIG. 5 is a perspective view of the valve actuator of FIG. 4 and an exhaust valve assembly of the engine of FIG. 1 with the valve actuator in a raised actuator position.

With reference to FIGS. 4 and 5, the exhaust valve actuator 104 has an electric motor and geared transmission assembly 118 fastened to a bracket 120. The bracket 120 is used to fasten the exhaust valve actuator 104 to a structure to support the exhaust valve actuator 104 at a location spaced from the rest of the engine 10. For example, in a vehicle, the bracket 120 could be fastened to the frame of the vehicle. It is contemplated that the exhaust valve actuator 104 could be connected to the crankcase 12, the cylinder block 14, the cylinder head 16 or some other portion of the engine 10. With reference to FIG. 4, an output shaft (not shown) of the electric motor and geared transmission assembly 118 passes through the bracket 120 and connects to an arm 122. The arm 122 pivotally connects to a rigid link 124. An end of the rigid link 124 is connected to the push-pull cable 112 to actuate the push-pull cable 112. Although in the present implementation the exhaust valve actuator 104 is an electrical exhaust valve actuator, it is contemplated that other types of exhaust valve actuators could be used. For example, it is contemplated that the exhaust valve actuator 104 described herein could be replaced by two pneumatic valve actuators similar to those described in U.S. Pat. No. 7,484,482, issued Feb. 3, 2009, and U.S. Pat. No. 7,762,220, issued Jul. 27, 2010, the entirety of both of which is incorporated herein by reference.

Figure 7:
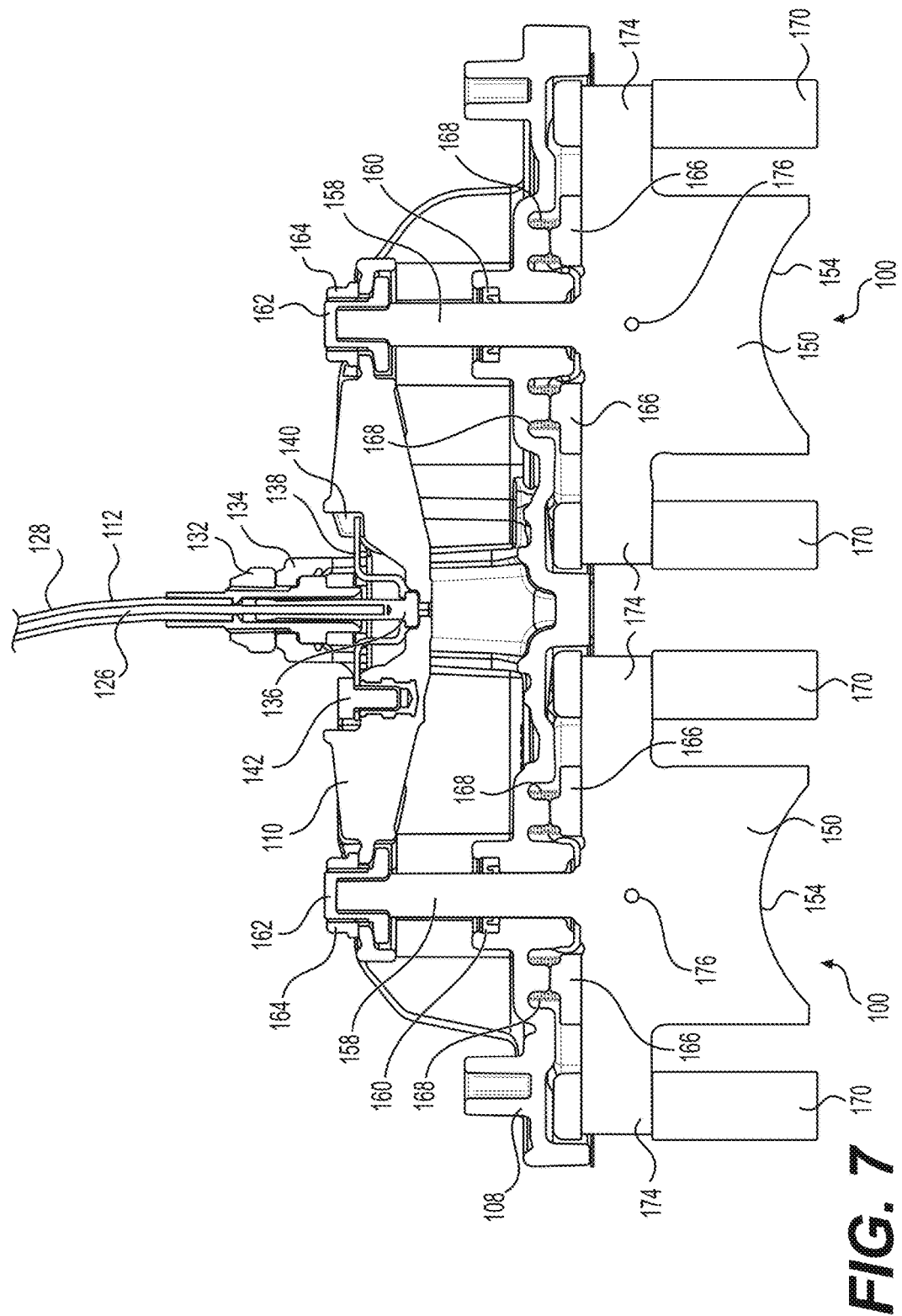
FIG. 7 is a cross-sectional view of the valve actuator and the exhaust valve assembly of FIG. 5 taken through line 7-7 of FIG. 6.

The push-pull cable 112 has a wire 126 slidably disposed inside a sheath 128 (see FIG. 7). One end of the sheath 128 is connected to the bracket 120 by a threaded fastener assembly 130 as can be seen in FIG. 4. The other end of the sheath 128 is similarly connected by a threaded fastener assembly 132 to a portion 134 of the base 108 that extends above a portion the valve connection member 110 as can be seen in FIG. 6. One end of the wire 126 is connected to the rigid link 124. The other end of the wire 126 protrudes from the sheath 128 as can be seen in FIG. 6. A rigid cap 136 is press-fitted on this end of the wire 126. The cap 136 is connected to a bracket 138. As can be seen in FIG. 7, one end of the bracket 138 is received in a slot defined by a tab 140 of the valve connection element 110. As can also be seen in FIG. 7, a fastener 142 is inserted through an aperture 144 (FIG. 4) in the other end of the bracket 138 to fasten this end of the bracket 138 to the valve connection member 110. As a result, the wire 126 of the push-pull cable 112 is rigidly connected to the valve connection member 110.

Turning now to FIGS. 5 to 9, the exhaust valves 100 will be described in more detail. For simplicity, as the two exhaust valves 100 are identical, only one of the two exhaust valves 100 will be described and corresponding components of the two exhaust valves 100 have been labeled with the same reference numerals.

The exhaust valve 100 is a two-part valve 100 including a primary valve 150 and a secondary valve 152. The primary valve 150 and the secondary valve 152 each have an edge 154, 156, respectively, shaped so as to match the shape of the cylinder bore of their corresponding cylinder 30. In operation, as in FIG. 10, the secondary valve 152 is supported and is disposed above the primary valve 150.

The primary valve 150 has an integrally formed connector 158 which connects the primary valve 150 to the connection member 110. As best seen in FIG. 7, the connector 158 passes through the base 108. A ring 160 is disposed between the base 108 and the connector 158 to guide the connector 158 as it moves with the connection member 110 and to prevent exhaust gases from exiting the valve receiving passage 60 by the aperture in the base 108 through which the connector 158 extends. The top end of the connector 158 is threaded. A cap 162 having internal and external threads is threaded onto the top end of the connector 158. The cap 162 extends through an aperture in the connection member 110. A nut 164 is threaded onto the portion of the cap 162 that protrudes from the connection member 110. As a result, the connector 158 is rigidly connected to the connection member 110 and slides in and out of the valve receiving passage 60 as the connection member 110 moves toward and away from the base 108 in response to actuation of the exhaust valve actuator 104, thereby moving the exhaust valve 100.

The secondary valve 152 has shoulders 166 (FIG. 7) that extend over the top of the primary valve 150. The shoulders 166 are engaged by the primary valve 150 as the primary valve 150 is moved to a fully opened position, as described in greater detail below. A pair of springs 168 is provided between the shoulders 166 of the secondary valve 152 and a bottom of the base 108. The springs 168 bias the secondary valve 152 away from the base 108.

The two-part valve 150 also has auxiliary valves 170 for restricting the flow of exhaust gases in the auxiliary exhaust passages 58. The auxiliary valves 170 are separate from and movably connected to the primary valve 150 via channels 172 (FIG. 6) in the auxiliary valves 170 that engage tabs 174 of the primary valve 150. As a result, the auxiliary valves 170 move together with the primary valve 150. Therefore, when the primary valve 150 moves in and out of the main exhaust passage 56, the auxiliary valves 170 simultaneously move in and out of the auxiliary exhaust passages 58. It is contemplated that the auxiliary valves 170, and herefore the tabs 174, could be omitted.

Figure 8:
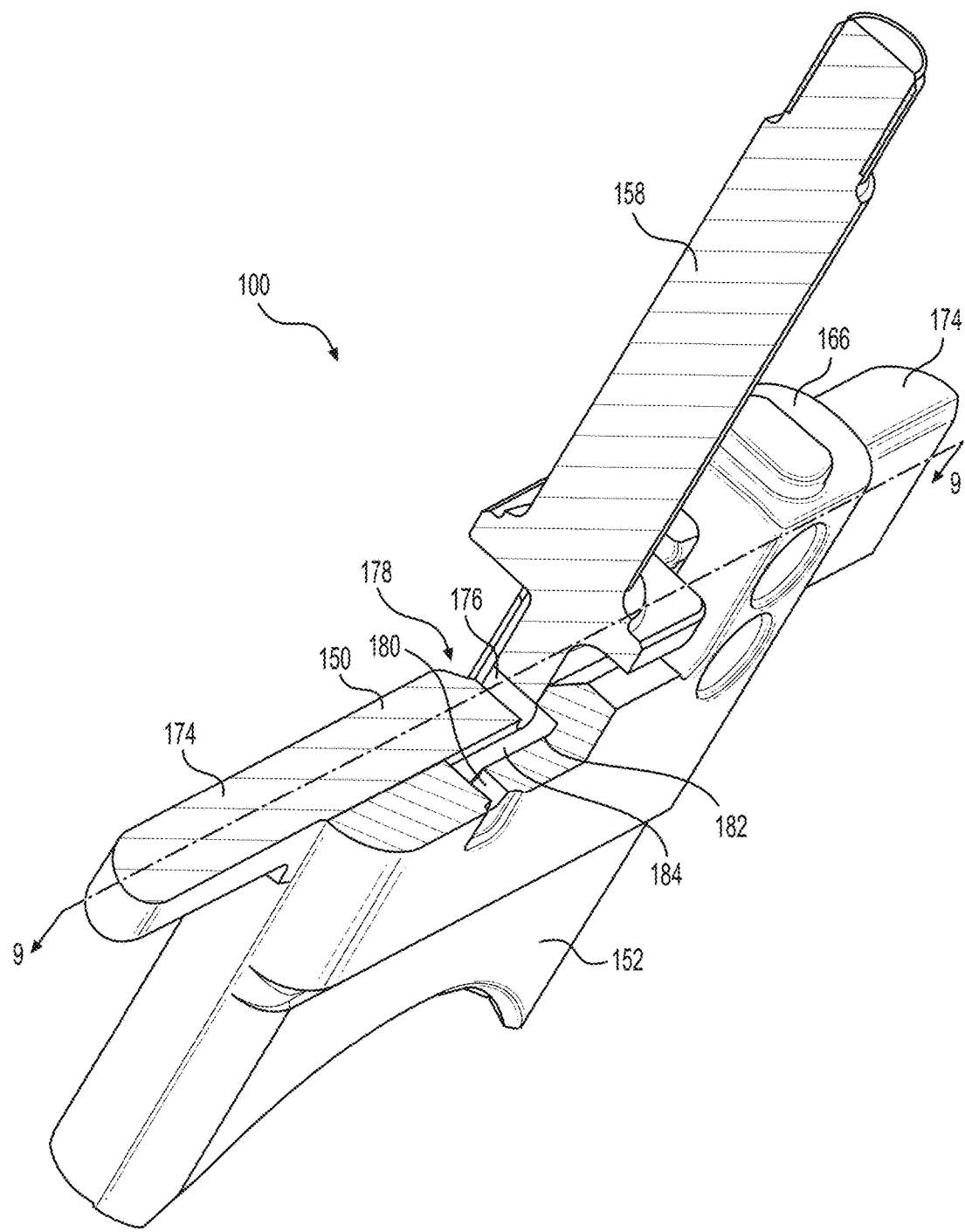
FIG. 8 is a partial cross-sectional view of a two-part valve of the exhaust valve assembly of FIG. 5 with auxiliary valves removed and with the two-part valve being in a configuration corresponding to the configuration of the two-part valve when the valve actuator is in a decompression actuator position.
Figure 9:
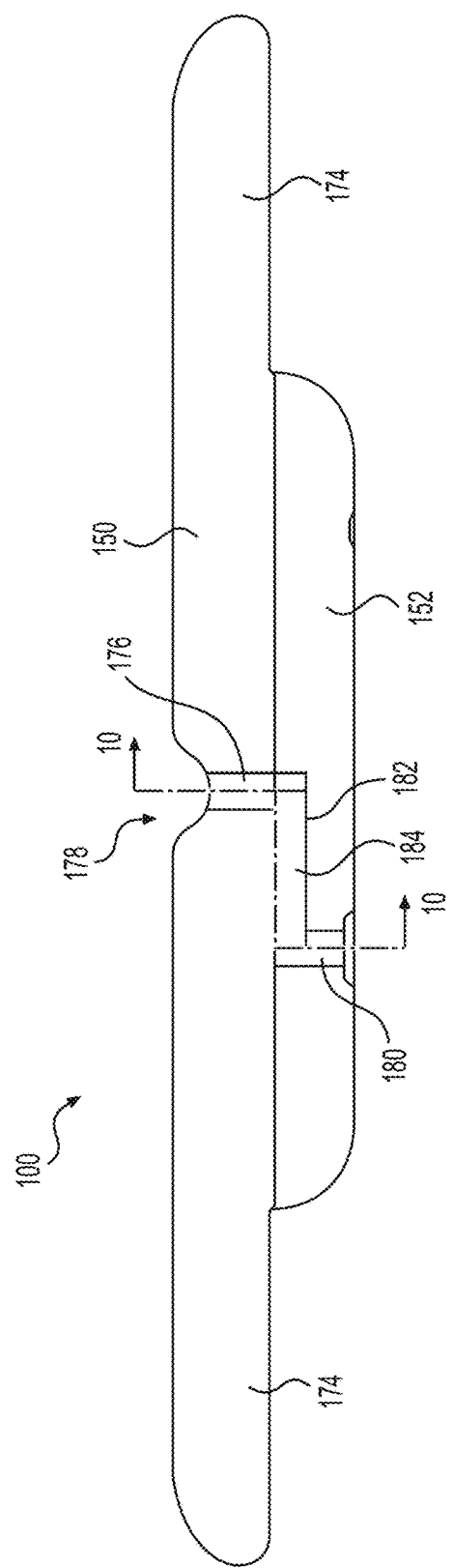
FIG. 9 is a cross-sectional view of the two-part valve of FIG. 8 taken through line 9-9 of FIG. 8.

As can be seen in FIGS. 8 and 9, the primary and secondary valves 150, 152 are provided with passages extending therethrough. These are decompression passages used for providing decompression of the combustion chambers during engine start-up as will be described in greater detail below.

The primary valve 150 has a decompression passage 176 that extends from an inlet aperture in the surface of the primary valve 150 facing the secondary valve 152 to an outlet aperture in the opposite surface. As can be seen, the inlet and outlet apertures of the decompression passage 176 are aligned. The primary valve 150 defines a central arcuate channel 178 that extends along its length up to the edge 154. As can be see in FIG. 9, the outlet aperture of the decompression passage 176 opens in this channel 178. It is contemplated that the decompression passage 176 and the channel 178 could be located off-center. It is also contemplated that the channel 178 could be omitted. It is also contemplated that the inlet and outlet apertures of the decompression passage 176 could not be lined up with each other.

The secondary valve 152 has a decompression passage 180 that extends from a flared inlet aperture in the surface of the secondary valve 152 that faces away from the primary valve 150 to the opposite surface. The decompression passage 180 is located at a position in the secondary valve 152 such that it can fluidly communicate with the decompression passage 64 defined in the cylinder block 14. As can be seen, the decompression passage 180 is parallel to and offset from the decompression passage 176 of the primary valve 150. In order to permit a fluid communication between the decompression passages 176, 180 when they are in the configuration shown in FIGS. 8 and 9, a channel 182 is formed in the surface of the secondary valve 152 that is adjacent to the primary valve 150. The channel 182 and the adjacent surface of the primary valve 150 form a decompression passage 184 that is perpendicular to both the decompression passages 176, 180. The decompression passage 184 always fluidly communicates with the decompression passage 180 and fluidly communicates the decompression passage 180 with the decompression passage 176 when the primary and secondary valves 150, 152 are in the configuration shown in FIGS. 8 and 9. It is contemplated that the channel 182, and therefore the decompression passage 184 could be provided in the primary valve 150. It is also contemplated that both valves 150, 152 could be provided with channels that form a decompression passage when the valves 150, 152 are in the proper configuration. It is also contemplated that the decompression passage 184 could be provided completely inside the secondary valve 152, except for its outlet. It is also contemplated that the decompression passage 176 could be moved so as to be aligned with the decompression passage 180, in which case the decompression passage 184 could be omitted.

Turning now to FIGS. 10 to 13, the operation of the exhaust valves 100 will be described. For simplicity, since both exhaust valves 100 move simultaneously the operation of only one of the exhaust valves 100 will be described. Also for simplicity, since the auxiliary valves 170 move together with the primary valve 150, their movements and positions within the auxiliary exhaust passages 58 will not be described.

In the present implementation, the exhaust valve actuator 104 has four actuator positions: a low actuator position, a decompression actuator position, an intermediate actuator position and a raised actuator position. Each actuator position has a corresponding position of the valve connection member 110 and a corresponding configuration of the exhaust valve 100. In the low actuator position, the valve connection member 110 is closest to the base 108 and the exhaust valve is in the configuration shown in FIG. 10. In the raised actuator position, the valve connection member 110 is furthest from the base 108 and the exhaust valve is in the configuration shown in FIG. 13. In the decompression actuator position, the valve connection member 110 is at a position intermediate its positions corresponding to the low and raised actuator positions, but is closer to its position corresponding to the low actuator position, and the exhaust valve 100 is in the configuration shown in FIG. 11. In the intermediate actuator position, the valve connection member 110 is at a position intermediate its positions corresponding to the decompression and raised actuator positions and the exhaust valve 100 is in the configuration shown in FIG. 12. It is contemplated that the intermediate actuator position could be omitted. It is also contemplated that there could be multiple intermediate actuators positions intermediate the decompression and raised actuator positions. It is also contemplated that there could be one or more actuator positions intermediate the decompression and low actuator positions.

With reference to FIG. 10, when the exhaust valve actuator 104 is in the low actuator position, the exhaust valve 100 is in a fully lowered position as shown. The fully lowered position of the exhaust valve 100 is the position in which the exhaust valve 100 restricts fluid flow through the main exhaust port 52 into the main exhaust passage 56 the most. In this position, the primary valve 150 extends in the main exhaust passage 56 in a fully lowered primary valve position and the secondary valve 152 extends in the main exhaust passage 56 in a fully lowered secondary valve position. As can be seen, when the secondary valve 152 is in the fully lowered secondary valve position, the decompression passage 180 is in alignment with the decompression passage 64 of the cylinder block 14. As such, the decompression passage 64 fluidly communicates with the decompression passages 180, 184 in the secondary valve 152 and fluids in the combustion chamber can flow through the decompression passages 64, 180, 184. However, as can also be seen, when the primary valve 150 is in the fully lowered primary valve position, the decompression passage 176 is not in alignment with the decompression passage 184 in the secondary valve 152. As such, the decompression passages 176 and 184 are fluidly separate and the primary valve 150 blocks the flow of fluids out of the decompression passage 184.

Figure 11:
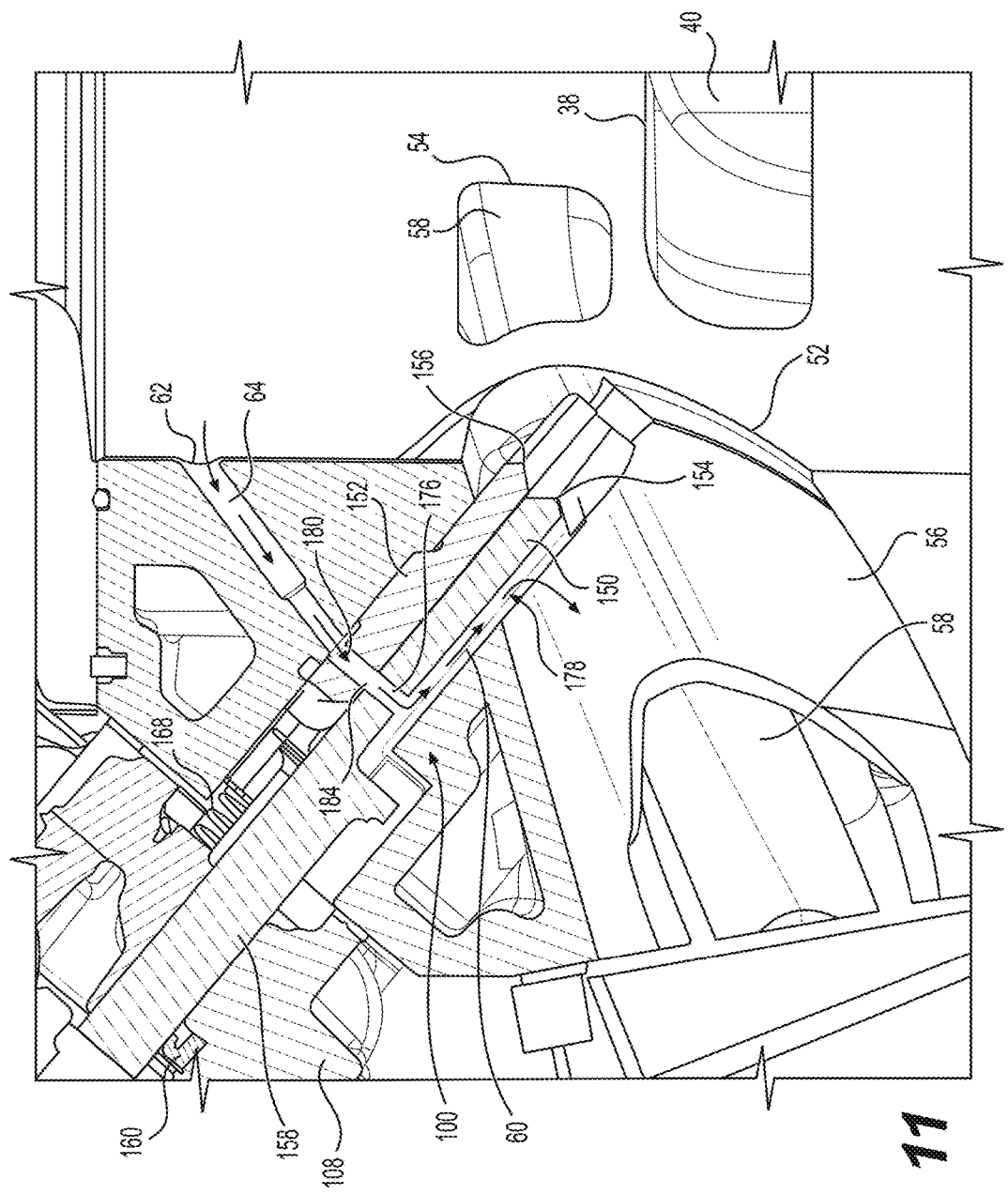
FIG. 11 is the cross-sectional view of FIG. 10 when the valve actuator is in the decompression actuator position.

With reference to FIG. 11, when the exhaust valve actuator 104 is in the decompression actuator position, the exhaust valve 100 is in a decompression position as shown. The decompression position of the exhaust valve 100 restricts fluid flow through the main exhaust port 52 into the main exhaust passage 56 slightly less than in the fully lowered position of the exhaust valve 100. In this position, the primary valve 150 is slightly withdrawn from the main exhaust passage 56 and extends in the main exhaust passage 56 in a decompression primary valve position and the secondary valve 152 is in the same fully lowered secondary valve position as in FIG. 10. As can be seen, when the primary valve 150 is in the decompression primary valve position and the secondary valve 152 is in the fully lowered secondary valve position, the decompression passage 176 is in alignment with the decompression passage 184 in the secondary valve 152. As such, the decompression passages 176 of the primary valve 150 fluidly communicates with the decompression passages 180, 184 of the secondary valve 152 which fluidly communicate with the decompression passage 64 of the cylinder block 14. Therefore, fluids in the combustion chamber can flow, as indicated by the arrows in FIG. 11, from the combustion chamber, through the decompression passage 64, then through the exhaust valve 100 by flowing consecutively through the decompression passages 180, 184, 176, then through the channel 178 and finally into the main exhaust passage 56.

Figure 12:
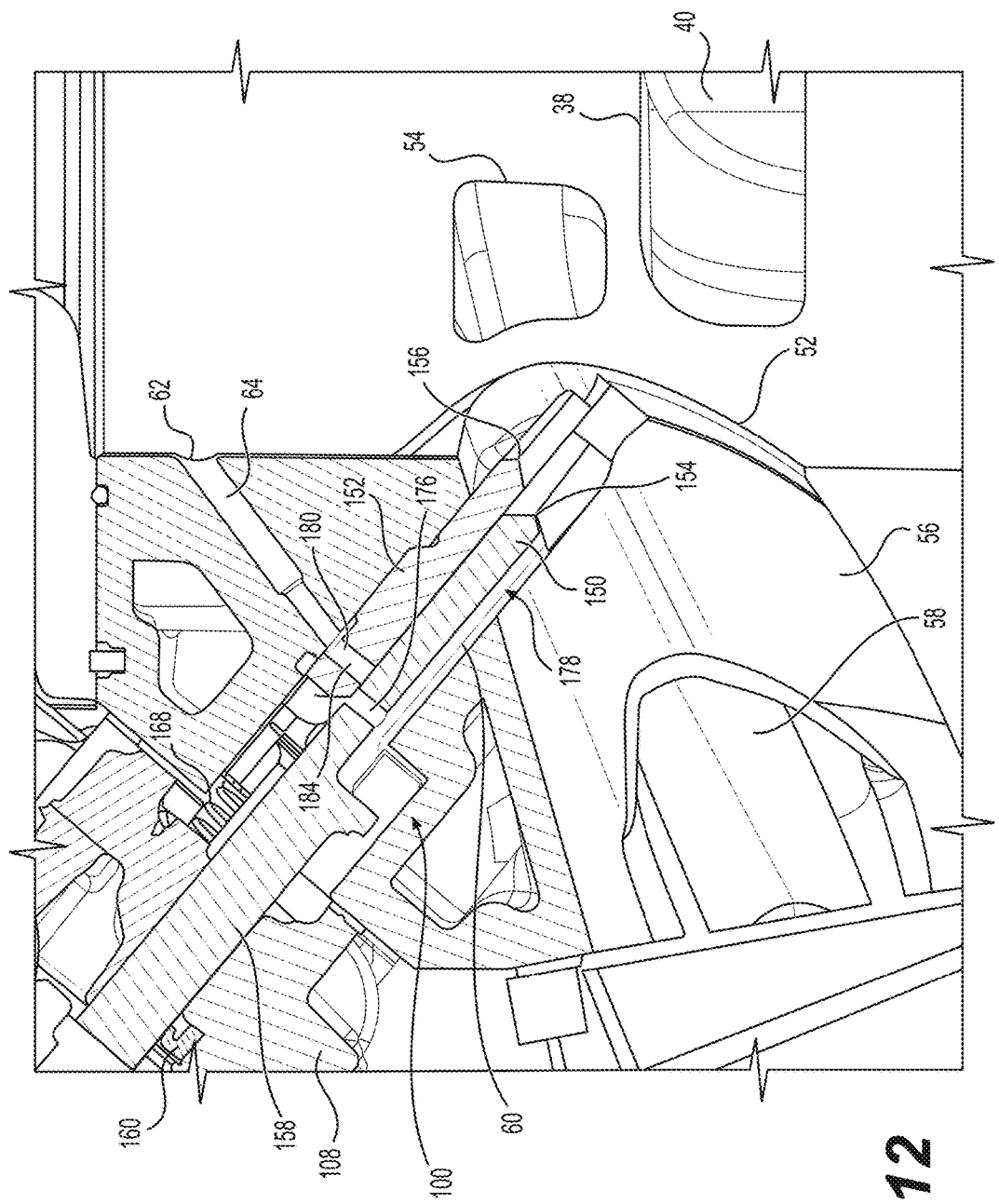
FIG. 12 is the cross-sectional view of FIG. 10 when the valve actuator is in an intermediate actuator position.

With reference to FIG. 12, when the exhaust valve actuator 104 is in the intermediate actuator position, the exhaust valve 100 is in an intermediate position as shown. The intermediate position of the exhaust valve 100 restricts fluid flow through the main exhaust port 52 into the main exhaust passage 56 less than in the decompression position of the exhaust valve 100. In this position, the primary valve 150 is partly withdrawn from the exhaust passage 56 and extends in the main exhaust passage 56 in an intermediate primary valve position and the secondary valve 152 is in the same fully lowered secondary valve position as in FIG. 10. As can be seen, when the primary valve 150 is in the intermediate primary valve position and the secondary valve 152 is in the fully lowered valve position, the decompression passage 176 is not in alignment with the decompression passage 184 in the secondary valve 152. As such, the decompression passages 176 and 184 are fluidly separate and the primary valve 150 blocks the flow of fluids out of the decompression passage 184.

Figure 13:
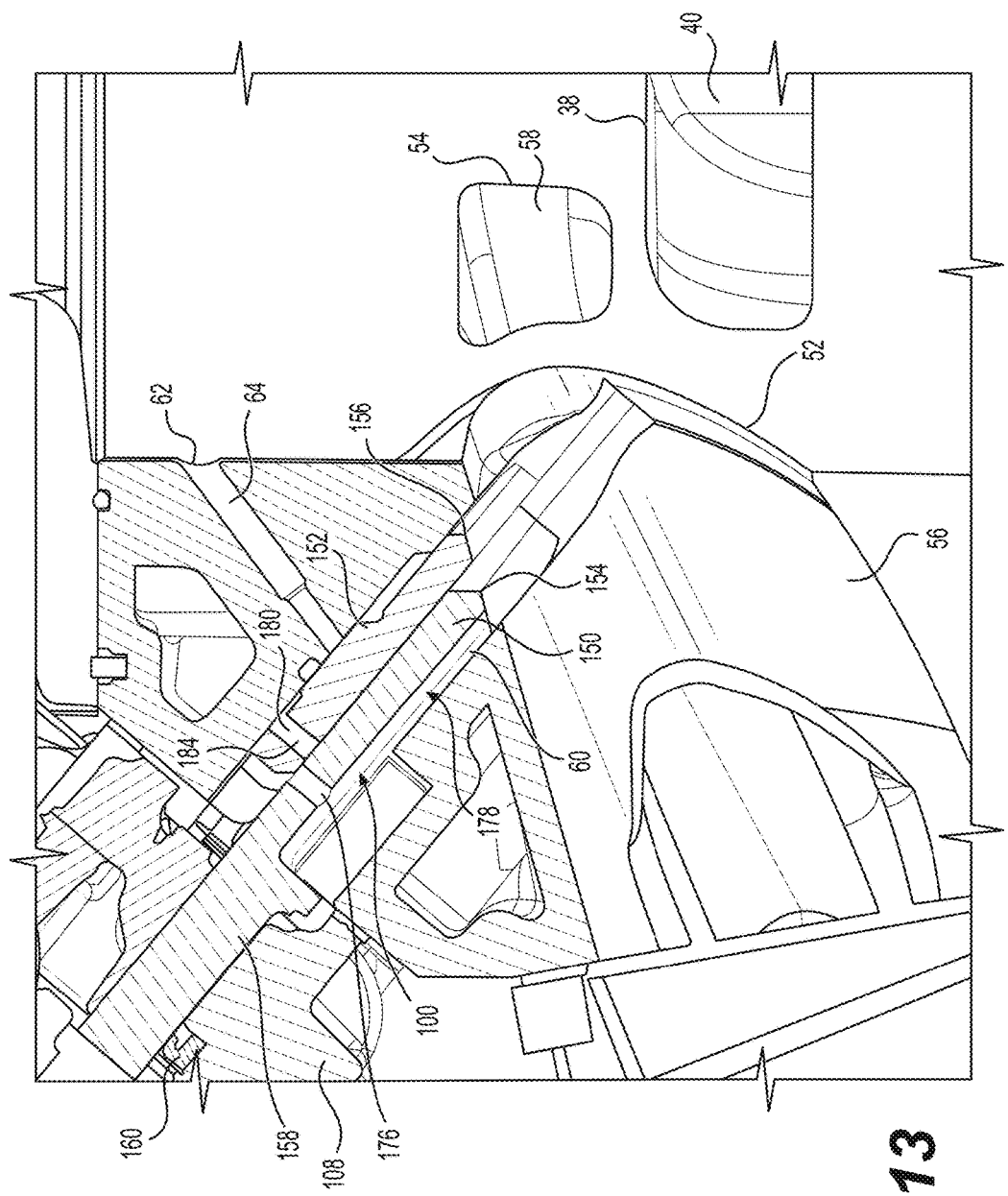
FIG. 13 is the cross-sectional view of FIG. 10 when the valve actuator is in the raised actuator position.

With reference to FIG. 13, when the exhaust valve actuator 104 is in the raised actuator position, the exhaust valve 100 is in a fully opened position as shown. The fully opened position of the exhaust valve 100 is the position in which the exhaust valve 100 restricts fluid flow through the main exhaust port 52 into the main exhaust passage 56 the least. In this position, the primary valve 150 is mostly withdrawn and extends in the main exhaust passage 56 in a fully opened primary valve position. As the primary valve 150 moves from the intermediate primary valve position (FIG. 12) to the fully opened primary valve position (FIG. 13), the primary valve 150 abuts the shoulders 166 of the secondary valves 152, thereby lifting and withdrawing the secondary valve 152 from the main exhaust passage 56 and compressing the springs 168. As a result, the secondary valve 152 is moved to the fully opened secondary valve position illustrated in FIG. 13. When the primary exhaust valve 150 is returned to the intermediate primary valve position (FIG. 12), the springs 168 bias the secondary valve 152 back to the fully lowered secondary valve position (FIG. 12). As can be seen in FIG. 13, when the secondary valve 152 is in the fully opened secondary valve position, the decompression passage 180 is not in alignment with the decompression passage 64 of the cylinder block 14. As such, the decompression passage 64 is fluidly separate from the decompression passages 180, 184 in the secondary valve 152 and the secondary valve 152 blocks the flow of fluids out of the decompression passage 64. As can also be seen, when the primary valve 150 is in the fully opened primary valve position, the decompression passage 176 is not in alignment with the decompression passage 184 in the secondary valve 152. As such, the decompression passages 176 and 184 are fluidly separate.

With reference to FIGS. 10 to 14, the operation of the exhaust valve assembly 102 will be described. During operation of the engine 10, the ECU 72 receives signals from the various sensors illustrated in FIG. 14 and sends signals to the exhaust valve actuator 104 to move the exhaust valves 100 to a position it determines to be appropriate to the current operating positions. The ECU 72 also uses signals from the exhaust valve position sensor 106 as a feedback to determine if the exhaust valves 100 have been moved to the right position and to determine if the exhaust valves 100 are already in the right position and therefore do not need to be moved. Generally, the position of the exhaust valves 100 is determined by the engine speed and the throttle position. If the signal from the engine speed sensor 74 indicates a low engine speed, such as an idle speed of the engine 10, the ECU 72 sends a signal to the exhaust valve actuator 104 to move to the low actuator position to move the exhaust valves 100 to their fully lowered positions (FIG. 10). If the signal from the engine speed sensor 74 indicates a medium engine speed, the ECU 72 sends a signal to the exhaust valve actuator 104 to move to the intermediate actuator position to move the exhaust valves 100 to their intermediate positions (FIG. 12). If the signal from the engine speed sensor 74 indicates a high engine speed, such as an engine speed of the engine 10 when the throttle valves 48 have been wide open for a certain amount of time, and the throttle valve position sensor 76 indicates that the throttle valve 48 are wide open the ECU 72 sends a signal to the exhaust valve actuator 104 to move to the raised actuator position to move the exhaust valves 100 to their fully opened positions (FIG. 13). It is contemplated that the ECU 72 could send a signal to the exhaust valve actuator 104 to move to the raised actuator position to move the exhaust valves 100 to their fully opened positions if the signal from the engine speed sensor 74 indicates a high engine speed and the throttle valve position sensor 76 indicates that the throttle valve 48 are nearly wide open or wide open. It is also contemplated that the ECU 72 could send a signal to the exhaust valve actuator 104 to move to the raised actuator position to move the exhaust valves 100 to their fully opened positions if the signal from the engine speed sensor 74 indicates a high engine speed regardless of the position of the throttle valves 48. It is also contemplated that the ECU 72 could additionally consider the throttle valve position to send a signal to the exhaust valve actuator 104 to move to the low actuator position and/or the intermediate actuator position.

When the engine 10 is in operation and the ECU 78 receives a signal from the start/stop switch 78 that is indicative that the engine 10 is to be stopped, the ECU 78 sends a signal to the exhaust valve actuator 104 to move to the decompression actuator position to move the exhaust valves 100 to their decompression positions (FIG. 11). As a result, the exhaust valves 100 are in their decompression positions when the engine 10 is to be started the next time. Therefore, as explained above, when the engine 10 is started the next time, the combustion chambers fluidly communicate with the main exhaust passage 56 via the decompression passages 64, 180, 184, 176 and the channel 178. Therefore, during engine start-up, as each piston 34 moves up and closes the main exhaust port 52 of its cylinder 30, fluid present in the combustion chamber can flow out of the combustion chamber via the decompression passages 64, 180, 184, 176. As a result, the pressure acting against the piston 34 as it moves up past the main exhaust port 52 is reduced compared to a situation where no decompression passage 64 would be provided and starting of the engine 10 is made easier because less force is required. This is known as decompression. It is contemplated that in an alternative or additional implementation, when the engine 10 is stopped, the ECU 78 could send a signal to the exhaust valve actuator 104 to move to the decompression actuator position to move the exhaust valves 100 to their decompression positions in response to receiving a signal from the start/stop switch 78 that is indicative that the engine 10 is to be started.

Once the engine 10 has been started, the ECU 78 sends signals to the exhaust valve actuator 104 to move to a position other than the decompression actuator position so as not to negatively affect the efficiency of the engine 10 due to the loss of pressure via fluid passing through the decompression passages 64, 180, 184, 176. In the present implementation, when the exhaust valve actuator 104 is in the decompression actuator position (FIG. 11), the ECU 72 will send signals to the exhaust valve actuator 104 to move to the low actuator position (FIG. 10) prior to moving to either one of the intermediate (FIG. 12) and the raised (FIG. 13) actuator positions. Also in the present implementation, when the exhaust valve actuator 104 is in either one of the intermediate (FIG. 12) and the raised (FIG. 13) actuator positions, the ECU 72 will send signals to the exhaust valve actuator 104 to move to the low actuator position (FIG. 10) prior to moving to the decompression actuator position (FIG. 11) in response to receiving a start or stop signal from the start/stop switch 78.

Figure 15:
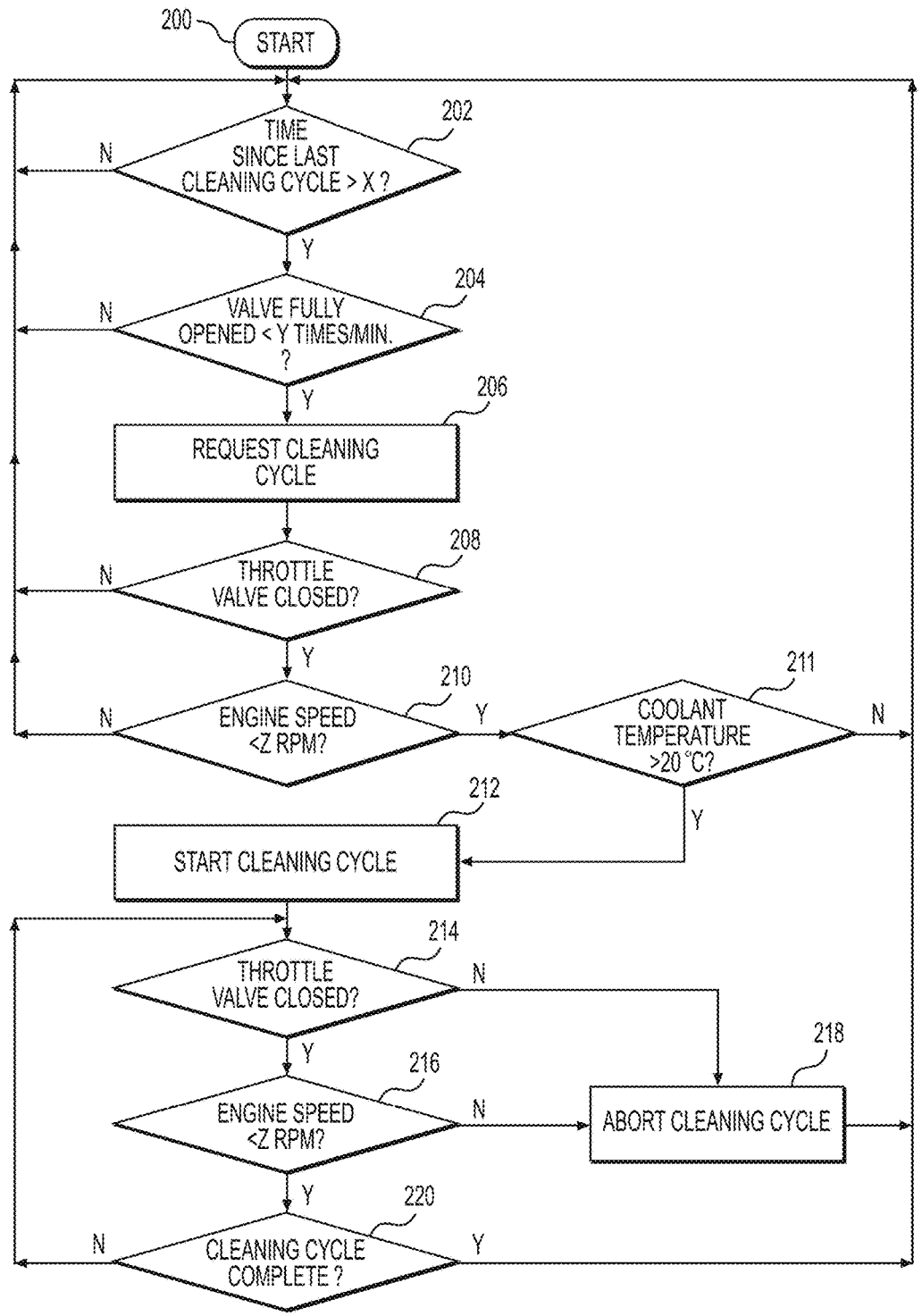
FIG. 15 is a logic diagram of a method for cleaning an exhaust valve of the engine of FIG. 1.
Figure 16:
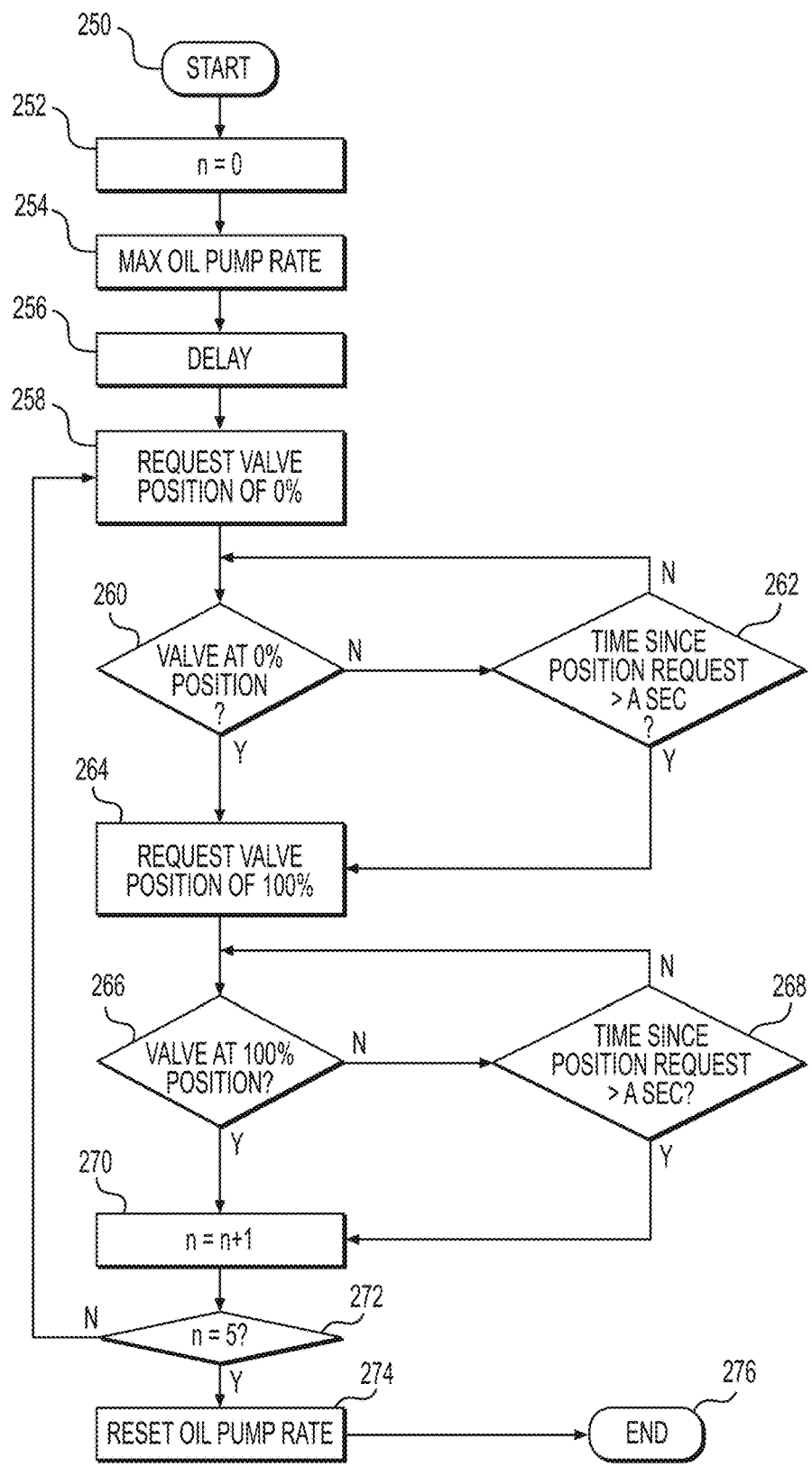
FIG. 16 is a logic diagram of a cleaning cycle used in the method illustrated in FIG. 15.

Turning now to FIGS. 15 and 16, a method for cleaning an exhaust valve of a two-stroke engine and a cleaning cycle for an exhaust valve will be described. The method and the cleaning cycle will be described with reference to the engine 10 and the exhaust valve assembly 102 described above. It is contemplated that the method and the cleaning cycle could be used for other types of two-stroke engines and other types of exhaust valve assemblies, such as exhaust valve assemblies having one or more one-part valves for example. In the present implementation, since a single exhaust valve actuator 104 moves both exhaust valves 100, the method and the cleaning cycle result in both valves 100 being cleaned at the same time. It is contemplated that in implementations where each exhaust valve 100 has its own valve actuator that the method and the cleaning cycle could be applied to each exhaust valve 100 individually such that the exhaust valves 100 may not be cleaned at the same time.

With reference to FIG. 15, the method begins at 200 when the engine 10 starts. At step 202, the ECU 72 determines if the time elapsed since a previous cleaning cycle has been completed is greater than a predetermined amount of time X. In one exemplary implementation, the predetermined amount of time X is 5 minutes. The ECU 72 achieves this based on data obtained from a timer 80 (FIG. 14). It is contemplated that the timer 80 could be separate from or integrated with the ECU 72. In one implementation, the ECU 72 records the time from the timer 80 when a cleaning cycle is completed and then compares the current time to the recorded time to determine if the amount of time elapsed is greater than X. In another implementation, the ECU 72 starts the timer 80 when a cleaning cycle is completed and then determines if the timer 80 has reached the predetermined amount of time X.

As step 204, the ECU 72 determines if the rate of opening of the exhaust valves 100 is less then a predetermined rate of Y times per minute. In one exemplary implementation, the predetermined rate Y is twice per minute. In the implementation illustrated in FIG. 15, the rate of opening of the exhaust valves 100 is the number of times the exhaust valves 100 have moved to their fully opened positions (FIG. 13) per minute. In an alternative implementation, the rate of opening of the exhaust valves 100 is the number of times the exhaust valves 100 have moved from their fully lowered positions (FIG. 10) to their fully opened positions (FIG. 13) per minute. The rate of opening of the exhaust valves 100 is determined by the ECU 72 based on signals received from the timer 80 (or another dedicated timer) and the exhaust valve position sensor 106.

If either one of the conditions described at steps 202 and 204 is not satisfied, the ECU 72 returns to step 202. If both the conditions described at steps 202 and 204 are satisfied, then the ECU 72 proceeds to step 206 described below. In an alternative implementation, it is contemplated that the ECU 72 could proceed to step 206 if either one of the conditions described at steps 202 and 204 is satisfied. It is also contemplated that one of steps 202 and 204 could be omitted. It is also contemplated that the order of steps 202, 204 could be reversed.

At step 206, the ECU 72 requests that an exhaust valve cleaning cycle be initiated. Then at steps 208, 210 and 211, described below, the ECU 72 determines if the operating conditions of the engine 10 are suitable for performing the exhaust valve cleaning cycle. At step 208, the ECU 72 receives a signal from the throttle valve position sensor 76 to determine if the throttle valves 48 are closed. At step 210, the ECU 72 receives a signal from the engine speed sensor 74 to determine if the engine speed is less than a predetermined engine speed of Z revolutions per minute (RPM). In some implementations, the predetermined engine speed Z is an engine speed that is close to the engine idle speed. In an exemplary implementation, the predetermined engine speed Z is 1500 RPM. At step 211, the ECU 72 receives a signal from the coolant temperature sensor 84 to determine if the coolant temperature is greater than a predetermined coolant temperature T. In an exemplary implementation, the predetermined coolant temperature T is 20° C.

If any one of the conditions described at steps 208, 210 and 211 is not satisfied, the ECU 72 returns to step 202. If all the conditions described at steps 208, 210 and 211 are satisfied, then the ECU 72 proceeds to step 212 described below. In an alternative implementation, it is contemplated that the ECU 72 could proceed to step 212 if any one of the conditions described at steps 208 and 210 is satisfied. It is also contemplated that one or two of steps 208, 210 and 211 could be omitted. It is also contemplated that the order of steps 208, 210 and 211 could be different than illustrated.

At step 212, the ECU 72 initiates the exhaust valve cleaning cycle. One contemplated exhaust valve cleaning cycle will be described in detail below with respect to FIG. 16. It is contemplated that other types of cleaning cycles could be used. While the cleaning cycle is being performed, the ECU 72 continues to monitor the conditions described below at steps 214, 216 to determine if the cleaning cycle should be aborted or if the cleaning cycle can continue to be performed up to completion.

Once the cleaning cycle has been initiated at step 212, then at step 214 the ECU 72 determines if the throttle valves 48 are still closed and at step 216 the ECU 72 determines if the engine speed is still less than the predetermined engine speed of Z RPM. If either one of the conditions described at steps 214 and 216 is not satisfied, the ECU 72 proceeds to step 218. At step 218, the ECU 72 aborts the exhaust valve cleaning cycle, returns to controlling the position of the exhaust valves 100 based on the operating conditions of the engine 10, and returns to step 202. If both the conditions described at steps 214 and 216 are satisfied, then the ECU 72 proceeds to step 220 described below. It is contemplated that the order of steps 214, 216 could be reversed.

At step 220, the ECU 72 determines if the exhaust valve cleaning cycle is completed. If the exhaust valve cleaning cycle is not completed, the ECU 72 returns to step 214. If the exhaust valve cleaning cycle is completed, the ECU 72 returns to controlling the position of the exhaust valves 100 based on the operating conditions of the engine 10, and returns to step 202.

Turning now to FIG. 16, the exhaust valve cleaning cycle will be described. The exhaust valve cleaning cycle begins at step 250 when the ECU 72 reaches step 212 in the method described above with respect to FIG. 15.

Then at step 252, the ECU 72 resets a counter 82 (FIG. 14) to zero. It is contemplated that the counter 82 could be separate from or integrated with the ECU 72. Then at step 254, the ECU 72 sends a signal to the oil pump 26 to increase the oil supply rate in order to supply more oil to the exhaust valves 100. In the present implementation, the ECU 72 causes the oil pump 26 to increase the oil supply rate to the maximum oil supply rate, but smaller oil supply rates are contemplated. Then at step 256, the ECU 72 applies a delay before proceeding to step 258. The delay of step 256 permits the oil pump 26 to reach its maximum oil supply rate. In one exemplary implementation, the delay of step 256 is 0.3 second.

At step 258, the ECU 72 sends a signal to the exhaust valve actuator 104 requesting that it moves to the low actuator position to move the exhaust valves 100 to their fully lowered positions (FIG. 10). It should be noted that the term "requesting" is used here because due to coking, as explained above, the exhaust valves 100 may stick to the walls of the valve receiving passages 60 and the exhaust valve actuator 104 may not be able to move the exhaust valves 100 to the requested position. Once the ECU 72 has requested that the exhaust valves be moved to their fully lowered (i.e. 0%) positions, then at step 260, based on the signal received from the exhaust valve position sensor 106, the ECU 72 determines if the exhaust valves 100 have reached their fully lowered positions. If they have, the ECU 72 proceeds to step 264 described below. If at step 260, the exhaust valves 100 have not reached their fully lowered positions, then the ECU 72 proceeds to step 262. At step 262, the ECU 72, based on the timer 80 (or a dedicated timer), determines if the time elapsed since the request to move the exhaust valves 100 to their fully lowered positions is greater than a predetermined amount of time of A seconds. In one exemplary implementation, the predetermined amount of time A is 0.5 seconds. If the time elapsed is less than A seconds, then the ECU 72 continues to send the request to the exhaust valve actuator 104 to move the exhaust valves 100 to their fully lowered positions and returns to step 260. If the time elapsed is more than A seconds, then the exhaust valves 100 are likely stuck, therefore the ECU 72 stops to send a request to the exhaust valve actuator 104 to move the exhaust valves 100 to their fully lowered positions and proceeds to step 264.

At step 264, the ECU 72 sends a signal to the exhaust valve actuator 104 requesting that it moves to the raised actuator position to move the exhaust valves 100 to their fully opened positions (FIG. 13). Once the ECU 72 has requested that the exhaust valves be moved to their fully opened (i.e. 100%) positions, then at step 266, based on the signal received from the exhaust valve position sensor 106, the ECU 72 determines if the exhaust valves 100 have reached their fully opened positions. If they have, the ECU 72 proceeds to step 270 described below. If at step 266, the exhaust valves 100 have not reached their fully opened positions, then the ECU 72 proceeds to step 268. At step 268, the ECU 72, based on the timer 80 (or a dedicated timer), determines if the time elapsed since the request to move the exhaust valves 100 to their fully opened positions is greater than the predetermined amount of time of A seconds. Although the same predetermined amount of time is used in both of steps 262 and 268, it is contemplated that they could be different amounts of time. If at step 268 the time elapsed is less than A seconds, then the ECU 72 continues to send a request to the exhaust valve actuator 104 to move the exhaust valves 100 to their fully opened positions and returns to step 266. If the time elapsed is more than A seconds, then the exhaust valves 100 are likely stuck, therefore the ECU 72 stops to send a request to the exhaust valve actuator 104 to move the exhaust valves 100 to their fully opened positions and proceeds to step 270.

At step 270, the ECU 72 causes the counter 82 to increase by one. Then at step 272, based on the value of the counter 82, the ECU 72 determines if the counter has reached five, indicating that steps 258 and 264 have each been done five times. It is contemplated that the value of the counter at step 272 could be more or less than five. If the counter is less than five at step 272, the ECU 72 returns to step 258. If the counter is five at step 272, then the ECU 272 proceeds to step 274.

At step 274, the ECU 72 resets the oil pump oil supply rate and sends control signals to the oil pump 26 to have an oil supply rate corresponding to the operating conditions of the engine 10. From step 274, the ECU 72 proceeds to step 276.

At step 276, the exhaust valve cleaning cycle is completed. As such, during the method described above with respect to FIG. 15, when the ECU 72 reaches step 220, the cleaning cycle is considered complete once the ECU 72 has reached step 276 of the cleaning cycle of FIG. 16.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An exhaust valve assembly for a two-stroke internal combustion engine comprising:
a valve actuator movable between a first actuator position, a second actuator position and a third actuator position, the second actuator position being intermediate the first and third actuator positions; and
a two-part valve having a primary valve and a secondary valve, the primary valve being operatively connected to the valve actuator,
the primary valve defining a first valve decompression passage,
the secondary valve defining a second valve decompression passage,
the primary valve being in a first primary valve position when the valve actuator is in the first actuator position,
the primary valve being in a second primary valve position when the valve actuator is in the second actuator position,
the primary valve being in a third primary valve position when the valve actuator is in the third actuator position,
the second primary valve position being intermediate the first and the third primary valve positions,
the secondary valve being in a first secondary valve position when the valve actuator is in any one of the first and second actuator positions,
the secondary valve being in a second secondary valve position when the valve actuator is in the third actuator position,
the first valve decompression passage fluidly communicating with the second valve decompression passage when the valve actuator is in the second actuator position, and
the first valve decompression passage being fluidly separate from the second valve decompression passage when the valve actuator is in any one of the first and third actuator positions.

2. The exhaust valve assembly of claim 1, wherein:
the valve actuator has a fourth actuator position intermediate the second and third actuator positions,
the primary valve is in a fourth primary valve position when the valve actuator is in the fourth actuator position,
the fourth primary valve position is intermediate the second and third primary valve positions,
the secondary valve being in the first secondary valve position when the valve actuator is in the fourth actuator position,
the first valve decompression passage being fluidly separate from the second valve decompression passage when the valve actuator is in the fourth actuator position.

3. The exhaust valve assembly of claim 1, wherein:
a third valve decompression passage is defined between the primary and secondary valves, and
the third valve decompression passage fluidly communicates the first valve decompression passage with the second valve decompression passage when the valve actuator is in the second actuator position.

4. The exhaust valve assembly of claim 3, wherein the third valve decompression passage always fluidly communicates with the second valve decompression passage.

5. The exhaust valve assembly of claim 3, wherein the first valve decompression passage is offset from the second valve decompression passage.

6. The exhaust valve assembly of claim 3, wherein:
the first valve decompression passage is parallel to the second valve decompression passage, and
the third valve decompression passage is perpendicular to the first and second valve decompression passages.

7. The exhaust valve assembly of claim 1, wherein:
the primary valve has a first surface, a second surface and an edge, the first surface facing the secondary valve, the second surface being opposite the first surface,
the first valve decompression passage defines an aperture in the second surface, and
the primary valve defines a channel extending from the aperture to the edge.

8. The exhaust valve assembly of claim 1, further comprising at least one spring biasing the secondary valve toward the first secondary valve position.

9. The exhaust valve assembly of claim 1, further comprising at least one auxiliary valve connected to the primary valve, the at least one auxiliary valve being movable with the primary valve.

10. The exhaust valve assembly of claim 1, wherein the two-part valve is a first two-part valve, the exhaust valve assembly further comprising:
a second two-part valve having a primary valve and a secondary valve, the primary valve being operatively connected to the valve actuator,
the primary valve defining a first valve decompression passage,
the secondary valve defining a second valve decompression passage,
the primary valve being in a first primary valve position when the valve actuator is in the first actuator position,
the primary valve being in a second primary valve position when the valve actuator is in the second actuator position,
the primary valve being in a third primary valve position when the valve actuator is in the third actuator position,
the second primary valve position being intermediate the first and the third primary valve positions,
the secondary valve being in a first secondary valve position when the valve actuator is in any one of the first and second actuator positions,
the secondary valve being in a second secondary valve position when the valve actuator is in the third actuator position,
the first valve decompression passage fluidly communicating with the second valve decompression passage when the valve actuator is in the second actuator position, and
the first valve decompression passage being fluidly separate from the second valve decompression passage when the valve actuator is in any one of the first and third actuator positions.

11. The exhaust valve assembly of claim 1, wherein the valve actuator is an electrical valve actuator; and
the exhaust valve assembly further comprises a push-pull cable operatively connecting the two-part valve to the valve actuator.

12. A two-stroke internal combustion engine comprising:
a crankcase;
a crankshaft disposed at least in part in the crankcase;
a cylinder block connected to the crankcase;
a cylinder defined in the cylinder block, the cylinder having a cylinder axis, the cylinder defining a decompression port and an exhaust port, the exhaust port being disposed between the decompression port and the crankshaft with respect to a direction defined by the cylinder axis,
the cylinder block defining an exhaust passage extending from the exhaust port and a cylinder decompression passage extending from the decompression port;
a piston movably disposed within the cylinder and being operatively connected to the crankshaft;
an exhaust valve selectively extending into the exhaust passage, the valve defining a valve decompression passage; and
a valve actuator operatively connected to the exhaust valve, the valve actuator being movable between a first actuator position, a second actuator position and a third actuator position, the second actuator position being intermediate the first and third actuator positions,
at least a portion of the exhaust valve being in a first valve position when the valve actuator is in the first actuator position,
at least the portion of the exhaust valve being in a second valve position when the valve actuator is in the second actuator position,
at least the portion of the exhaust valve being in a third valve position when the valve actuator is in the third actuator position,
the second valve position being intermediate the first and the third valve positions,
at least the portion of the valve extending further in the exhaust passage in the first valve position than in the second valve position,
at least the portion of the valve being withdrawn from the exhaust passage in the third valve position,
the valve decompression passage fluidly communicating the cylinder decompression passage with the exhaust passage when the valve actuator is in the second actuator position, and
the cylinder decompression passage not fluidly communicating with the exhaust passage via the valve decompression passage when the valve actuator is in any one of the first and third actuator positions.

13. The engine of claim 12, further comprising a controller electronically connected to the valve actuator for controlling a position of the valve actuator, the controller causing the valve actuator to move to the second actuator position in response to a signal indicative of at least one of engine start-up and engine shut-down.

14. The engine of claim 13, wherein when the valve actuator is in the second actuator position, the controller causes the valve actuator to move from the second actuator position to the first actuator prior to moving to the third actuator position.

15. The engine of claim 13, wherein when the valve actuator is in the third actuator position, the controller causes the valve actuator to move from the third actuator position to the first actuator position prior to moving to the second actuator position in response to the signal indicative of the at least one of engine start-up and engine shut-down.

16. The engine of claim 12, wherein:
the exhaust valve is a two-part valve having a primary valve and a secondary valve, the primary valve is operatively connected to the valve actuator, the primary valve is the portion of the valve,
the valve decompression passage includes at least a first valve decompression passage and a second valve decompression passage,
the primary valve defines the first valve decompression passage,
the secondary valve defines the second valve decompression passage,
the first valve position is a first primary valve position of the primary valve,
the second valve position is a second primary valve position of the primary valve,
the third valve position is a third primary valve position of the primary valve,
the secondary valve is in a first secondary valve position when the valve actuator is in any one of the first and second actuator positions, the secondary valve extends in the exhaust passage when in the first secondary valve position, the second valve decompression passage fluidly communicates with the cylinder decompression passage when the secondary valve is in the first secondary valve position,
the secondary valve is in a second secondary valve position when the valve actuator is in the third actuator position, the secondary valve is withdrawn from the exhaust passage when in the second secondary valve position, the second valve decompression passage is fluidly separate from the cylinder decompression passage when the secondary valve is in the second secondary valve position, when the valve actuator is in the second actuator position:
the first valve decompression passage fluidly communicates with the second valve decompression passage, and
the cylinder decompression passage fluidly communicates with the exhaust passage via the first and second valve decompression passages, and when the valve actuator is in any one of the first and third actuator positions, the cylinder decompression passage does not fluidly communicate with the exhaust passage via the first and second valve decompression passages.

17. The engine of claim 16, wherein when the valve actuator is in any one of the first and third actuator positions, the first valve decompression passage is fluidly separate from the second valve decompression passage.

18. The engine of claim 16, further comprising at least one spring biasing the secondary valve toward the first secondary valve position.

19. The engine of claim 16, wherein:
the exhaust passage is a main exhaust passage;
the cylinder defines at least one auxiliary exhaust port;
the cylinder block defines at least one auxiliary exhaust passage extending from the at least one auxiliary exhaust port to the main exhaust passage;
the exhaust valve has at least one auxiliary exhaust valve connected to the primary exhaust valve and selectively extending in the at least one auxiliary exhaust passage; and
the at least one auxiliary valve being movable with the primary valve.

20. The engine of claim 12, wherein the valve actuator is an electrical valve actuator; and
the engine further comprises a push-pull cable operatively connecting the exhaust valve to the valve actuator.

* * * * *